United States Patent [19]

Bernotavicz

[11] 3,922,353

[45] Nov. 25, 1975

[54] SHELF STABLE, HIGH MOISTURE, FILLED FOOD PRODUCT

[75] Inventor: John W. Bernotavicz, Barrington, Ill.

[73] Assignee: The Quaker Oats Company, Chicago, Ill.

[22] Filed: Mar. 25, 1974

[21] Appl. No.: 454,213

[52] U.S. Cl. ............... 426/94; 426/283; 426/331; 426/543; 426/559
[51] Int. Cl.² ............................................ A23G 3/00
[58] Field of Search ....... 426/93, 94, 151, 194, 228, 426/212, 213, 283, 284, 138, 344, 346

[56] References Cited
UNITED STATES PATENTS

| | | | |
|---|---|---|---|
| 3,202,514 | 8/1965 | Burgess et al. | 426/151 X |
| 3,480,445 | 11/1969 | Slaybaugh | 426/93 X |
| 3,634,104 | 1/1972 | Kaplow et al. | 426/151 |
| 3,653,908 | 4/1972 | Buck et al. | 426/151 |
| 3,732,112 | 5/1973 | Frankenfeld et al. | 426/151 |
| 3,736,148 | 5/1973 | Katz | 426/151 X |

Primary Examiner—Raymond N. Jones
Attorney, Agent, or Firm—Donnie Rudd; Mathew R. P. Perrone, Jr.

[57] ABSTRACT

A shelf stable, high moisture, filled food product is disclosed. The food product has a meat containing filling with a major portion thereof enclosed by cooked expanded cereal. The meat containing filling has a moisture content of at least about 50 percent by weight and a water activity, $A_w$, of at least about 0.90 and comprises cooked, proteinaceous meaty material acidified with an edible, non-toxic acid and an effective amount of an antimycotic. The product is prepared by cooking a proteinaceous meaty material, mixing it with an edible, non-toxic acid and an effective amount of antimycotic, then extruding under puffing conditions a hot cooked cereal dough through a first die and simultaneously extruding the stable filling through a second die, in the same direction and without cooling, and subdividing the extrudate into food shaped pieces followed by drying the food shaped pieces to decrease the moisture content thereof.

27 Claims, No Drawings

स्3,922,353

SHELF STABLE, HIGH MOISTURE, FILLED FOOD PRODUCT

BACKGROUND OF THE INVENTION

1. Field of the Invention

This invention relates to a shelf stable, filled food product. The outer portion of the food product is cereal based. The inner portion is a high moisture meat containing filling. The filling has a moisture content greater than about 50 percent by weight but is stable against mold and bacterial growth. The food product is highly desirable as a human food and as a pet food.

2. Description of the Prior Art

Centerfilling of food products is well known. For instance, Slaybaugh U.S. Pat. No. 3,480,445, Wisdom et al. U.S. Pat. No. 3,615,675, and Henthorn et al. U.S. Pat. No. 3,764,715, show various methods of centerfilling of cereal products. Heretofore, however, no one has been able to centerfill a cereal product with a meat containing filling because meat containing fillings have not heretofore been shelf stable in a form that would permit filling in a cereal product. Shelf stable meaty type fillings have either taken the form of mince meatlike products or "jerky-type" products neither of which can be effectively extruded and remain moist and stable. In the area of pet foods, shelf stable foods have generally been in the semi-moist area but these products have a moisture content much lower than is desirable in the present invention and do not provide sufficient moisture content to create the type product herein desired. Since high moisture containing meaty type foods have generally required aseptic canning, no one has been able to adapt these to a centerfilled product. This invention creates the first centerfilled product which has as a filling a meaty type product with a water activity, $A_w$, greater than about 0.90 and a water content greater than about 50 percent by weight but which is also stable against mold and bacterial growth.

SUMMARY OF THE INVENTION

It is an object of this invention to provide a shelf stable, centerfilled product which has as a filling a high moisture, meaty containing material.

It is another object of this invention to provide a centerfilled food product which has as its filling material a meaty containing material having a moisture content greater than about 50 percent by weight and a water activity greater than above about 0.90 but which is also stable against mold and bacterial growth.

It is another object of this invention to provide a centerfilled food product wherein the center comprises predominantly cooked proteinaceous meaty material but which is also shelf stable against mold and bacterial growth.

It is a further object of this invention to provide a process for producing a food product in accordance with the above objectives.

The objects of this invention are accomplished by a food product comprising a shelf stable, high moisture, meat containing filling have a major portion thereof enclosed by a cooked expanded cereal, said meat containing filling having a moisture content of at least about 50 percent by weight and having a water activity, $A_w$, of at least about 0.90, said filling comprising cooked proteinaceous meaty material, acidified with from about 1.7 percent to about 3.8 percent by weight edible nontoxic acid sufficient to cause the filling to have a pH of from about 3.9 to about 5.5; and an effective amount of antimycotic.

The objects of this invention are further accomplished by a food product comprising a shelf stable, high moisture, meat containing filling having a major portion thereof enclosed by a cooked expanded cereal, said meat containing filling having a moisture content of at least about 50 percent by weight and having a water activity, $A_w$, of at least about 0.90, said filling comprising greater than 50 percent by weight cooked proteinaceous meaty material; from about 1 percent to about 35 percent by weight gelatinized starchy filler material with the total amount of cooked proteinaceous meaty material plus starchy filler material comprising greater than about 85 percent by weight of the filling; from about 1.7 percent to about 3.8 percent by weight edible, non-toxic acid sufficient to cause the filling to have a pH of from about 3.9 to about 5.5; and an effective amount of antimycotic.

Preferably the objects of this invention are accomplished as is above described but also including an effective amount of antioxidant in the filling.

The objects may also be accomplished by inclusion of from about 2–4 percent by weight edible fat or oil in the filling and may also include from about 0.1 to 3 percent by weight emulsifier in the filling.

The objects of this invention are further accomplished by a good product comprising a shelf stable, high moisture, meat containing filling having a major portion thereof enclosed by a cooked expanded cereal, said meat containing filling having a water content of at least about 50 percent by weight and having a water activity, $A_w$, of at least about 0.90, said filling comprising greater than about 90 percent by weight cooked proteinaceous meaty material, from 1 percent to 5 percent by weight galatinized starchy material, from about 1.7 percent to about 3.8 percent by weight edible, non-toxic acid sufficient to cause the filling to have a pH of from about 3.9 to 5.5, and an effective amount of antimycotic.

The objects of this invention are further accomplished by a food product comprising a shelf stable, high moisture, liver-like filling having a major portion thereof enclosed by a cooked expanded cereal, said liver-like filling having a water content at least about 50 percent by weight and having a water activity, $A_w$, of at least about 0.90, said liver-like filling comprising about 90 percent by weight cooked pork or beef liver, about 4 percent by weight edible fat or oil, about 3 percent by weight gelatinized starch, about 2 percent by weight edible acid, and an effective amount of antioxidant and antimycotic.

The objects of this invention are further accomplished by a food product comprising a shelf stable, high moisture, liver-like filling having a major portion thereof enclosed by a cooked expanded cereal, said liver-like filling having a water content of at least about 50 percent by weight and having a water activity, $A_w$, of at least about 0.90, said filling comprising from 85 to 95 percent by weight cooked pork or beef liver, from 0–6 percent by weight edible fat or oil, from 2–5 percent by weight galatiinized starch material, from about 1.7 to 3.8 percent by weight edible, non-toxic acid in order to provide a pH of from about 3.9 to 5.5, and an effective amount of antioxidant and antimycotic.

The objects of this invention are also accomplished by a food product comprising a shelf stable, high moisture, chicken based filling having a major portion thereof enclosed by a cooked expanded cereal, said chicken based filling having a water content of at least about 50 percent by weight and having a water activity, $A_w$, of at least about 0.90, said filling comprising from about 85 percent to 95 percent by weight cooked chicken parts, from about 1 to 6 percent by weiight edible fat or oil, from about 2 to 6 percent by weight galatinized starch material, from about 1.7 to 3.8 percent by weight edible, non-toxic acid in order to give a pH of from about 3.9 to 5.5, and an effective amount of antioxidant and antimycotic.

The objects of this invention are also accomplished by a food product comprising a shelf stable, high moisture, fish based filling having a major portion thereof enclosed by a cooked expanded cereal, said fish based filling having a water content of at least about 50 percent by weight and a water activity, $A_w$, of at least about 0.90, said filling comprising from about 85 to 95 percent by weight cooked fish, from about 1 to 6 percent by weight edible fat or oil, from about 2 to 5 percent by weight gelatinized starch materials, from about 1.7 to 3.8 percent by weight edible, non-toxic acid in order to provide a pH of from about 3.9 to 5.5, and an effective amont of antioxidant and antimycotic.

The objects as to process in this invention are accomplished by a process for producing a coated shelf stable food product, said process comprising the steps:

A. preparing a shelf stable filling material by cooking a proteinaceous meaty material; admixing the cooked proteinaceous meaty material with an edible, non-toxic acid and an effective amount of antimycotic; said edible, non-toxic acid being provided in an amount of from about 1.7 percent to about 3.8 percent by weight and being sufficient to cause the filling to have a pH of from about 3.9 to about 5.5;

B. extruding under puffing conditions a hot cooked cereal dough through a first die thereby forming an expanded cereal extrudate;

C. simultaneously extruding the shelf stable filling through a second die, said second die being positioned within the orifice of the first die in such a manner that the extrudate from the first die completely surrounds the extrudate from the second die and in such a manner that the direction of flow of the second extrudate is the same as the direction of flow of the first extrudate, and said shelf stable filling being heated as it is being extruded within the first die extrudate;

D. subdividing the extrudate into food shaped pieces; and

E. drying the food shaped pieces to decrease the moisture content of the expanded cereal outer extrudate.

The objects of this invention are further accomplished by a process for producing a coated shelf stable food product, said process comprising the steps:

A. preparing a shelf stable filling material by admixing a proteinaceous meaty material with an edible, non-toxic acid and an effective amount of antimycotic; said edible, non-toxic acid being provided in an amount of from about 1.7 percent to about 3.7 percent by weight and sufficient to cause the filling to have a pH of from about 3.9 to about 5.5;

B. cooking the shelf stable filling;

C. extruding under puffing conditions a hot cooked cereal dough through a first die thereby forming an expanded cereal extrudate;

D. simultaneously extruding the shelf stable filling through a second die, said second die being positioned within the orifice of the first die in such a manner that the extrudate from the first die completely surrounds the extrudate from the second die and in such a manner that the direction of flow of the second extrudate is the same as the direction of flow of the first extrudate, and said shelf stable filling being heated as it is being extruded within the first die extrudate;

E. subdividing the extrudate into food shaped pieces; and

F. drying the food shaped pieces to decrease the moisture content of the expanded cereal outer extrudate.

The objects of this invention are still further accomplished by a process for producing a coated shelf stable food product, said process comprising the steps:

A. preparing a shelf stable filling material by cooking a proteinaceous meaty material; admixing the meaty material with a starch filler material, an edible non-toxic acid, and an effective amount antimycotic, in amounts sufficient to provide at least about 50 percent by weighht cooked, proteinaceous, meaty material and from about 1 percent to about 35 percent by weight gelatinized starchy filler material with the total amount of cooked, proteinaceous meaty material plus starchy filler material comprising greater than about 85 percent by weight of the filling, from about 1.7 percent to about 3.8 percent by weight edible, non-toxic acid sufficient to cause the filling to have a pH of from about 3.9 to about 5.5;

B. extruding under puffing conditions a hot cooked cereal dough through a first die thereby forming an expanded cereal extrudate;

C. simultaneously extruding the shelf stable filling through a second die, said second die being positioned within the orifice of the first die in such a manner that the extrudate from the first die completely surrounds the extrudate from the second die and in such a manner that the direction of flow of the second extrudate is the same as the direction of flow of the first extrudate, and said shelf stable filling being heated as it is being extruded within the first die extrudate;

D. subdividing the extrudate into food shaped pieces; and

E. drying the food shaped pieces to decrease the moisture content of the expanded cereal outer extrudate.

The objects of this invention are also accomplished by a process for producing a coated shelf stable food product, said process comprising the steps:

A. preparing a shelf stable filling material by admixing a proteinaceous meaty material with a starchy filler material, an edible, non-toxic acid and an effective amount of antimycotic in amounts sufficient to provide at least about 50 percent by weight proteinaceous, meaty material and from about 1 percent to about 35 percent by weight gelatinized starchy filler material with the total amount of proteinaceous meaty material plus starchy filler material comprising greater than about 85 percent by weight of the filling, from about 1.7 percent to about 3.8 percent by weight edible, non-toxic acid sufficient to cause the filling to have a pH of from about 3.9 to about 5.5;

B. cooking the filling mixture;

C. extruding under puffing conditions a hot cooked cereal dough through a first die thereby forming an expanded cereal extrudate;

D. simultaneously extruding the shelf stable filling through a second die, said second die being positioned within the orifice of the first die in such a manner that the extrudate from the first die completely surrounds the extrudate from the second die and in such a manner that the direction of flow of the second extrudate is the same as the direction of flow of the first extrudate, and said shelf stable filling being heated as it is being extruded within the first die extrudate;

E. subdividing the extrudate into food shaped pieces; and

F. drying the food shaped pieces to decrease the moisture content of the expanded cereal outer extrudate.

The objects of this invention are still further accomplished by a process for producing a coated shelf stable food product, said process comprising the steps:

A. preparing a shelf stable filling material by cooking a proteinaceous meaty material; admixing the cooked meaty material with a gelatinized starchy filler, an edible non-toxic acid, and an effective amount of antioxidant and antimycotic in amounts sufficient to provide at least about 90 percent by weight cooked, proteinaceous, meaty material, from about 1 percent to about 5 percent by weight gelatinized starchy filler material, and from about 1.7 percent to about 3.8 percent by weight edible, non-toxic acid sufficient to cause the filling to have a pH of from about 3.9 to 5.5;

B. extruding under puffing conditions a hot cooked cereal dough through a first die thereby forming an expanded cereal extrudate;

C. simultaneously extruding the shelf stable filling through a second die, said second die being positioned within the orifice of the first die in such a manner that the extrudate from the first die completely surrounds the extrudate from the second die and in such a manner that the direction of flow of the second extrudate is the same as the direction of flow of the first extrudate, and said shelf stable filling being heated as it is being extruded within the first die extrudate;

D. subdividing the extrudate into food shaped pieces; and

E. drying the food shaped pieces to decrease the moisture content of the expanded cereal outer extrudate.

The objects of this invention are additionally accomplished by a process for producing a coated shelf stable food product, said process comprising the steps;

A. preparing a liver-like filling material by cooking pork or beef liver; admixing the liver with a gelatinized starchy material, an edible non-toxic acid, and effective amount of antioxidant and antimycotic in amounts sufficient to provide from about 85 to 95 percent by weight edible fat or oil, from about 2–5 percent by weight gelatinized starchy material, and from about 1.7 to 3.8 percent by weight edible, non-toxic acid in order to provide a pH of from about 3.9 to 5.5;

B. extruding under puffing conditions a hot cooked cereal dough through a first die thereby forming an expanded cereal extrudate;

C. simultaneously extruding the liver-like filling through a second die, said second die being positioned within the orifice of the first die in such a manner that the extrudate from the first die completely surrounds the extrudate from the second die and in such a manner that the direction of flow of the second extrudate is the same as the direction of flow of the first extrudate, and said liver-like filling being heated as it is being extruded within the first die extrudate;

D. subdividing the extrudate into food shaped pieces; and

E. drying the food shaped pieces to decrease the moisture content of the expanded cereal outer extrudate.

the objects of this invention are still further accomplished by a process for producing a coated shelf stable food product, said process comprising the steps:

A. preparing a chicken-based filling material by cooking a mixture of chicken parts; admixing the cooked chicken parts with a gelatinized starchy filler material, an edible non-toxic acid and an effective amount of antioxidant and antimycotic in amounts sufficient to provide from about 85–95 percent by weight cooked chicken parts, from about 2–5 percent by weight gelatinized starchy filler material, and from about 1.7 to 3.8 percent by weight edible, non-toxic acid in order to provide a pH of from about 3.9 to 5.5;

B. extruding under puffing conditions a hot cooked cereal dough through a first die thereby forming an expanded cereal extrudate;

C. simultaneously extruding the chicken-based filling through a second die, said second die being positioned within the orifice of the first die in such a manner that the extrudate from the first die completely surrounds the extrudate from the second die and in such a manner that the direction of flow of the second extrudate is the same as the direction of flow of the first extrudate, and said chicken-based filling being heated as it is being extruded within the first die extrudate;

D. subdividing the extrudate into food shaped pieces; and

E. drying the food shaped pieces to decrease the moisture content of the expanded cereal outer extrudate.

The objects of this invention are further accomplished by a process for producing a coated shelf stable food product, said process comprisng the steps:

A. preparing a fish-based filling material by cooking fish; admixing the cooked fish with a gelatinized starchy filler material, an edible non-toxic acid, and an effective amount of antioxidant and antimycotic in amounts sufficient to provide from about 85–95 percent by weight cooked fish, from about 2–5 percent by weight gelatinized starchy filler material, from about 1.7 to 3.8 percent by weight edible, non-toxic acid in order to provide a pH of from about 3.9 to 5.5;

B. extruding under puffing conditions a hot cooked cereal dough through a first die thereby forming an expanded cereal extrudate;

C. simultaneously extruding the fish-based filling through a second die, said second die being positioned within the orifice of the first die in such a manner that the extrudate from the first die completely surrounds the extrudate from the second die and in such a manner that the direct of flow of the second extrudate is the same as the direction of flow of the first extrudate, and said fish-based filling being heated as it is being extruded within the first die extrudate;

D. subdividing the extrudate into food shaped pieces; and

E. drying the food shaped pieces to decrease the moisture content of the expanded cereal outer extrudate.

The outer portion of the product of this invention comprises a cooked expanded cereal product. By use herein of the term "cooked expanded cereal", it is intended to mean any cereal or grain-based product which is normally prepared for use in feeding to the type of animal being served this product. For instance, if human consumption is desired, then the cooked expanded cereal can be any of the well known cereal products currently available in extruded expanded form. If a pet food is desired, then any of the well known extruded cereal based pet foods may be utilized. The product may or may not contain other materials along with the cereal. Generally the product will include corn meal, soy meal, oats, wheat or other such grains. A typical formula for a chicken flavored outer shell would have say about 24 percent by weight poultry meal, about 17–18 percent corn flour, about 16–17 percent soy meal, about 13 percent by weight oat groats, from about 12–13 percent by weight wheat, about 5 percent by weight stabilizer or antimycotic such as propylene glycol or potassium sorbate, about 8 percent edible acid, and various other flavoring ingredients and vitamins. A liver-type formula, a beef-type formula and a cheese-type formula could have approximately the same amount of grains but would include different flavoring agents to provide the type of flavor desired. In preparation of these products, the cereal portion is simply admixed together and extruded in an extruder of the type described in U.S. Pat. No. 3,541,946 to Ronald Johnson or of the type described in U.S. Pat. No. 3,764,715 to Larry Henthorn et al. The conditions of extrusion are such as is necessary to achieve the product desired. Generally the product is heated in the extruder and due to the increase of pressure and steam therein expands upon exiting from the die.

The centerfilling portion of this invention is a meat containing product having a water activity, $A_w$, of at least about 0.90. The term "water activity, $A_w$" is well known within the semi-moist or intermediate moisture animal food industry and the water activity of this product is generally higher than any of the known dry, semi-moist, or intermediate moisture products.

Generally, the shelf stable high moisture containing filling portion of the food product of this invention has a water content above about 50 percent by weight, a protein content in the order of about 25 percent by weight, and a fat content somewhere around 10–15 percent by weight although these amounts may be varied as the desired product ingredients are changed to effect the desired nutritional and/or feeding characteristics.

The centerfilled food product of this invention includes a meaty material which has preferably been precooked. In other words, the proteinaceous meaty material preferably is cooked prior to inclusion in the process although this is not absolutely mandatory.

With regard to the filling material, the term "proteinaceous meaty material" refers to the group consisting of meat, meat by-products, and meat meal, as well as mixtures of these. The term "meat" is understood to apply not only to the flesh of cattle swine, sheep and goats, but also to horses, whales and other mammals, as well as poultry and fish. The term "meat by-products" is intended to refer to those non-rendered parts of the carcass of slaughtered animals including but not restricted to mammals, poultry and the like, and including such constituents as are embraced by the term "meat by-products" in the definitions of feed ingredients published by the Association of Feed Control Officials, Inc. Likewise, the term "meat meal" refers to the finely ground dry rendered residue from animal tissues including those dried residues embraced by the term in the aforesaid official definition of the Association of American Feed Control Officials, Inc. The terms "meat", "meat by-products", and "meat meal" are understood to apply to all of those animal, poultry and marine products defined by said association.

The filling portion of the food product of this invention may also include appropriate amounts of gelatinized starchy filler material. The starchy filler material may include starchy flours or other such material from oil seeds or legumes and includes such things as corn flour, and wheat flour. It includes the oil expressed or extracted meals and cakes of the various oil seeds and legume products. The starchy material used herein must be substantially gelatinized and by "gelatinization" it is taken to mean the term with the well accorded definition within the cereal industry. Together, the starch filler material and precooked proteinaceous meaty material preferably comprise at least about 85 percent by weight of the filling. If about 90 percent by weight of the filling material in a proteinaceous meaty material, then it is preferred not to supply more than about 2 to about 5 percent by weight of starchy filler material. If the minimum preferred amount of proteinaceous meaty material is included, that is, if only slightly greater than about 50 percent by weight precooked proteinaceous meaty material is used, then it is preferred to use up to about 35 percent by weight of the gelatinized starchy material in order that the combination of starchy filler material and precooked proteinaceous meaty material total a minimum of about 85 percent by weight of the total filling material. The amount and ratio of proteinaceous meaty material and gelatinized, starchy, filler material may be adjusted depending upon the desired texture characteristics as well as the desired nutritional characteristics. In other words, if one desires higher proteinaceous content, then more proteinaceous meaty material is used. The higher the starch content, the firmer the product and the more that it will set to give a firm dough-like end product.

The filling material of the food product of this invention also must include from about 1.7 percent to about 3.8 percent by weight of an edible, non-toxic acid sufficient to cause the filling material to have a pH from about 3.9 to about 5.5. The ediible, non-toxic acid of this invention includes those edible, non-toxic acids commonly used in semi-moist or intermediate moisture food industry. In other words, the edible, non-toxic acid includes such acids as hydrochloric acid, phosphoric acid, citric acid, tartaric acid, gluconic acid, fumaric acid, malic acid, glutaric acid, lactic acid, succinic acid, adipic acid, pimelic acid, acetic acid, and propionic acid, although other edible, non-toxic acids generally known to the intermediate moisture food industry may be acceptable for use in this invention.

The filling portion of this invention preferably also includes the utilization of effective amounts of an antioxidant. The antioxidants normally used in the semi-moist or intermediate moisture food industry may be utilized in this invention. Ethoxyquin is of particularly good use in this invention. Other known edible non-toxic antioxidants may also be used in the place of ethoxyquin. Another particularly good antioxidant is sold under the trademark Tenox 6 (registered trademark Eastman Kodak Company, Rochester, New York) and consists of approximately 10 percent BHA, 10 percent BHT, 6 percent propyl gallate, 6 percent citric acid, 12 percent propylene glycol, 28 percent corn oil, and 28 percent by weight glycerol mono-oleate. The amount of antioxidant is an amount sufficient to effect the desired antioxidant properties in the product. Generally, this amount is limited by governmental regulation of inclusion in the product but could, if allowed, go up to about 1 percent by weight of the total product. Generally this amount is much lower, and in the case of ethoxyquin constitutes about 0.2 percent by weight of the filling material. It is only in certain cases of rancidity that the antioxidant is used and it need not be used in evey embodiment of this invention.

This filling portion of this invention also must include the use of an effective amount of antimycotic. The antimycotics well known in the semi-moist or intermediate moisture food industry may be used. For instance, the product may include edible benzoates or propionates as well as the sorbate salts. Of particular importance in this invention are the use of sodium benzoate, calcium propionate and potassium sorbate. Again, the amount of antimycotic is an amount sufficient to prevent mold and bacterial growth within the product. Generally this amount is limited by governmental regulation on the particular antimycotic used. The total amount of antimycotic should never exceed about 1 percent by weight of the total product and in the case of a combination of sodium benzoate and calcium propionate each may be applied in an amount, say, of about 1/8 of 1 percent by weight of the total product.

It may be desirable also to include within this filling about 2 to about 4 percent by weight edible fat or oil which may include animal fats and oils as well as vegetable fats and oils. The animal fats used herein are the general animal derived fatty materials such as choice white grease, but may also include other fats and tallows generally acceptable for inclusion in food products. When fat or oil is included, it must be balanced with the starch in order to provide the appropriate texture desired. Higher fat contents are used for softer products and for products that may be pumped or have a paté-like characteristic. Again, a higher starch-to-fat ratio is used when a firmer product is desired.

In some aspects of this invention it may also be desirable to include an emulsifier in the filling. In such cases an emulsifier is used in order to effect pumping or spreadability of the product. Of particular use in this invention are embulsifiers having a HLB ratio of from about 1 to about 5 and consisting of mixtures of monoglycerides and diglycerides of fat forming fatty acids. One such emulsifier commercially available is marketed as Atmos 300® (registered trademark of Atlas Chemical Industries, Inc., Wilmington, Delaware) and is a light amber clear liquid at 75°F. with from 47–50 percent alpha monoglycerides and from 54–59 percent total monoglycerides. The product has an HLB ratio of 2.8±1, an iodine value of 74–78, is insoluble in water at 75°F. and soluble in cottonseed oil at 75°F. Other emulsifiers having similar emulsification properties are likewise useful in this invention.

The process of this invention, although simple, is highly unique in providing a new and novel centerfilled food product. The process preferably comprises cooking a proteinaceous meaty material as hereinbefore described. The proteinaceous meaty material is admixed with the ingredients as hereinbefore described and cooking as is normally regarded in the food industry. However, it is not necessary to fully cook the meat in this process as some cooking may occur in the extrusion process, and to the extent that cooking occurs in the extrusion process, the cooking of the meat when admixed with the other ingredients may not be to the fullest extent but may be deferred until the extrusion process. After the filling material is prepared by admixing the material and cooking (to some extent) the mixture, the material is then placed in an extruder such as that described hereinbefore and extruded with the cereal material as hereinbefore described being on the outer surface and the meaty filling material being on the inner surface. In this case, heating occurs in the extrusion process sufficient to cook and expand the cereal product and sufficient to finish cooking the meaty filling material. The hot cereal dough is extruded around the stabilized meaty material and then the product is subdivided into food-shaped pieces. This subdividing can either be by a knife blade cutting the product into small portions, that is, bite-sized portions or portions such as candy bar size which would be subdivided when consumed by the human, or, it can be crimped as shown in U.S. Pat. No. 3,764,715 to form an end product that is a pillow shaped cereal piece having a filling therein with the cereal completely enveloping and enclosing the filling. In any case, the cereal is extruded around the meaty material causing extruded cereal material to substantially surround the meaty material. After the material is subdivided into food shaped pieces it is then dried to decrease the moisture content of the expanded cereal outer extrudate. Depending upon the desired texture of the finished product this product may be allowed to dry simply by exposing it to room temperature air or it may be placed in a heating oven to slightly decrease the moisture content of the expanded cereal outer extrudate. In any case, the drying of the cereal should be such that the final moisture content of the exterior portion of the cereal is below about 10 percent by weight.

DESCRIPTION OF THE PREFERRED EMBODIMENTS

This invention may be more fully described but is not limited by the following examples. When used in the examples, the emulsifier Atmos 300 refers to a trademark issued to Atlas chemical Industries, Inc., Wilmington, Delaware, and the anitoxidant Tenox 6 refers to the product sold under the registered trademark of Eastman Kodak Company, Rochester, New York.

Example 1

A quantity of beef liver was crushed and cooked in a pressure cooker. The beef liver was admixed with other ingredients to give the following formula:

| Ingredients | Parts by Weight |
| --- | --- |
| Beef liver | 90.00 |
| Choice white grease (animal fat) | 4.0 |
| Gelatinized corn flour | 3.0 |
| Adipic acid | 2.0 |
| Emulsifier (Atmos 300) | 0.5 |
| Ethoxyquin | 0.2 |
| Sodium benzoate | 0.125 |
| Calcium propionate | 0.125 |
| Additional antioxidant (Tenox 6) | 0.05 |

A cereal mixture was prepared by admixing the following ingredients:

| Ingredients | Parts by Weight |
| --- | --- |
| Poultry meal | 24.0 |
| Whole yellow corn | 17.8 |
| Dehulled soybean meal | 16.4 |
| Oat groats | 13.0 |
| Wheat | 12.5 |
| Propylene glycol | 5.0 |
| Phosphoric acid | 2.0 |
| Water | 1.0 |
| Salt | .8 |
| Vitamins, minerals, color, flavoring | 7.5 |

The meaty filling and cereal covering were placed in an extruder as shown in U.S. Pat. No. 3,764,715. The product was extruded with the cereal slightly expanding about the centerfilling upon extrusion. The product was crimped into pillow-shaped particles about ¾ to 1 inch long. The filling had a moisture content of approximately 53 percent, a protein content above 25 percent, and a fat content of approximately 13 percent by weight. The pH of the filling was approximately 4.45. The product was highly acceptable as a cat food and was shelf stable against mold and bacterial growth.

Example 2

A quantity of pork liver was crushed and cooked in a pressure cooker. The pork liver was mixed with other ingredients to give a formula having the following composition:

| Ingredients | Parts by Weight |
| --- | --- |
| Pork liver | 90.00 |
| Animal fat (choice white grease) | 4.0 |
| Pregelatinized corn flour | 3.0 |
| Adipic acid | 2.0 |
| Emulsifier (Atmos 300) | 0.5 |
| Ethoxyquin | 0.2 |
| Sodium benzoate | 0.125 |
| Calcium propionate | 0.125 |
| Additional antioxidant (Tenox 6) | 0.05 |

A cereal mixture was prepared by admixing the following ingredients:

| Ingredients | Parts by Weight |
| --- | --- |
| Poultry meal | 24.0 |
| Whole yellow corn | 17.8 |
| Dehulled soybean meal | 16.4 |
| Oat groats | 13.0 |
| Wheat | 12.5 |
| Propylene glycol | 5.0 |
| Phosphoric acid | 2.0 |
| Water | 1.0 |
| Salt | .8 |
| Vitamins, minerals, color, flavoring | 7.5 |

The meaty filling and cereal covering were placed in an extruder as shown in U.S. Pat. No. 3,764,715. The product was extruded with the cereal slightly expanding about the centerfilling upon extrusion. The product was crimped into pillow shaped particles about ¾ to 1 inch long. The product was highly acceptable as a cat food and was shelf stable against mold and bacterial growth.

Example 3

A quantity of pork liver was crushed and cooked in a pressure cooker. The pork liver was mixed with other ingredients to give a formula having the following composition:

| Ingredients | Parts by Weight |
| --- | --- |
| Pork liver | 90.00 |
| Animal fat (choice white grease) | 4.0 |
| Pregelatinized corn flour | 3.0 |
| Succinic acid | 2.25 |
| Emulsifier (Atmos 300) | 0.5 |
| Ethoxyquin | 0.2 |
| Sodium benzoate | 0.125 |
| Calcium propionate | 0.125 |
| Additional antioxidant (Tenox 6) | 0.05 |

A cereal mixture was prepared by admixing the following ingredients:

| Ingredients | Parts by Weight |
| --- | --- |
| Poultry meal | 24.0 |
| Whole yellow corn | 17.8 |
| Dehulled soybean meal | 16.4 |
| Oat groats | 13.0 |
| Wheat | 12.5 |
| Propylene glycol | 5.0 |
| Phosphoric acid | 2.0 |
| Water | 1.0 |
| Salt | .8 |
| Vitamins, minerals, color, flavoring | 7.5 |

The meaty filling and cereal covering were placed in an extruder as shown in U.S. Pat. No. 3,764,715. The product was extruded with the cereal slightly expanding about the centerfilling upon extrusion. The product was crimped into pillow-shaped particles about ¾ to 1 inch long. The water activity of the filling was found to be 0.98 and the pH of the filling was found to be about 4.3. The product was highly acceptable as a cat food and was shelf stable against mold and bacterial growth.

Example 4

A quantity of pork liver was crushed and cooked in a pressure cooker. The pork liver was mixed with other ingredients to give a formula having the following composition:

| Ingredients | Parts by Weight |
| --- | --- |
| Pork liver | 90.00 |
| Animal fat (choice white grease) | 4.0 |
| Pregelatinized corn flour | 3.0 |
| Fumeric acid | 2.0 |

-continued

| Ingredients | Parts by Weight |
| --- | --- |
| Emulsifier (Atmos 300) | 0.5 |
| Ethoxyquin | 0.2 |
| Sodium benzoate | 0.125 |
| Calcium propionate | 0.125 |
| Additional antioxidant (Tenox 6) | 0.05 |

A cereal mixture was prepared by admixing the following ingredients:

| Ingredients | Parts by Weight |
| --- | --- |
| Poultry meal | 24.0 |
| Whole yellow corn | 17.8 |
| Dehulled soybean meal | 16.4 |
| Oat groats | 13.0 |
| Wheat | 12.5 |
| Propylene glycol | 5.0 |
| Phosphoric acid | 2.0 |
| Water | 1.0 |
| Salt | .8 |
| Vitamins, minerals, color, flavoring | 7.5 |

The meaty filling and cereal covering were placed in an extruder as shown in U.S. Pat. No. 3,764,715. The product was extruded with the cereal slightly expanding about the centerfilling upon extrusion. The product was crimped into pillow-shaped particles about ¾ to 1 inch long. The water activity, $A_w$, of the filling was found to be 0.98 and the pH of the filling was found to be about 4.0. The product was highly acceptable as a cat food and was shelf stable against mold and bacterial growth.

Example 5

A quantity of pork liver was crushed and cooked in a pressure cooker. The pork liver was mixed with other ingredients to give a formula having the following composition:

| Ingredients | Parts By Weight |
| --- | --- |
| Pork liver | 90.00 |
| Animal fat (choice white grease) | 4.0 |
| Pregelatinized corn flour | 3.0 |
| Citric acid | 2.50 |
| Emulsifier (Atmos 300) | 0.5 |
| Ethoxyquin | 0.2 |
| Sodium benzoate | 0.125 |
| Calcium propionate | 0.125 |
| Additional antioxidant (Tenox 6) | 0.05 |

A cereal mixture was prepared by admixing the following ingredients:

| Ingredients | Parts by Weight |
| --- | --- |
| Poultry meal | 24.0 |
| Whole yellow corn | 17.8 |
| Dehulled soybean meal | 16.4 |
| Oat groats | 13.0 |
| Wheat | 12.5 |
| Propylene glycol | 5.0 |
| Phosphoric acid | 2.0 |
| Water | 1.0 |
| Salt | .8 |
| Vitamins, minerals, color, flavoring | 7.5 |

The meaty filling and cereal covering were placed in an extruder as shown in U.S. Pat. No. 3,764,715. The product was extruded with the cereal slightly expanding about the centerfilling upon extrusion. The product was crimped into pillow-shaped particles about ¾ to 1 inch long. The water activity, $A_w$, of the filling was found to be 0.98 and the pH of the filling was found to be about 3.5. The product was highly acceptable as a cat food and was shelf stable against mold and bacterial growth.

Example 6

A quantity of pork liver was crushed and cooked in a pressure cooker. The pork liver was mixed with other ingredients to give a formula having the following composition:

| Ingredients | Parts by Weight |
| --- | --- |
| Pork liver | 90.00 |
| Animal fat (choice white grease) | 4.0 |
| Pregelatinized corn flour | 3.0 |
| Tartaric acid | 2.50 |
| Emulsifier (Atmos 300) | 0.5 |
| Ethoxyquin | 0.2 |
| Sodium benzoate | 0.125 |
| Calcium propionate | 0.125 |
| Additional antioxidant (Tenox 6) | 0.05 |

A cereal mixture was prepared by admixing the following ingredients:

| Ingredients | Parts by Weight |
| --- | --- |
| Poultry meal | 24.0 |
| Whole yellow corn | 17.8 |
| Dehulled soybean meal | 16.4 |
| Oat groats | 13.0 |
| Wheat | 12.5 |
| Propylene glycol | 5.0 |
| Phosphoric acid | 2.0 |
| Water | 1.0 |
| Salt | .8 |
| Vitamins, minerals, color, flavoring | 7.5 |

The meaty filling and cereal covering were placed in an extruder as shown in U.S. Pat. No. 3,764,715. The product was extruded with the cereal slightly expanding about the centerfilling upon extrusion. The product was crimped into pillow-shaped particles about ¾ to 1 inch long. The water activity, $A_w$, of the filling was found to be 0.98 and the pH of the filling was found to be about 3.5. The product was highly acceptable as a cat food and was shelf stable against mold and bacterial growth.

Example 7

A quantity of pork liver was crushed and cooked in a pressure cooker. The pork liver was mixed with other ingredients to give a formula having the following composition:

| Ingredients | Parts By Weight |
| --- | --- |
| Pork liver | 90.00 |
| Animal fat (choice white grease) | 4.0 |
| Pregelatinized corn flour | 3.0 |
| Acetic acid | 1.75 |
| Emulsifier (Atmos 300) | 0.5 |
| Ethoxyquin | 0.2 |
| Sodium benzoate | 0.125 |
| Calcium propionate | 0.125 |
| Additional antioxidant (Tenox 6) | 0.05 |

A cereal mixture was prepared by admixing the following ingredients:

| Ingredients | Parts by Weight |
| --- | --- |
| Poultry meal | 24.0 |
| Whole yellow corn | 17.8 |
| Dehulled soybean meal | 16.4 |
| Oat groats | 13.0 |
| Wheat | 12.5 |
| Propylene glycol | 5.0 |
| Phosphoric acid | 2.0 |
| Water | 1.0 |
| Salt | .8 |
| Vitamins, minerals, color, flavoring | 7.5 |

The meaty filling and cereal covering were placed in an extruder as shown in U.S. Pat. No. 3,764,715. The product was extruded with the cereal slightly expanding about the centerfilling upon extrusion. The product was crimped into pillow-shaped particles about ¾ to 1 inch long. The water activity, $A_w$, of the filling was found to be 0.97 and the pH of the filling was found to be about 4.96. The product was highly acceptable as a cat food and was shelf stable against mold and bacterial growth.

Example 8

A quantity of pork liver was crushed and cooked in a pressure cooker. The pork liver was mixed with other ingredients to give a formula having the following composition:

| Ingredients | Parts By Weight |
| --- | --- |
| Pork liver | 90.00 |
| Animal fat (choice white grease) | 4.0 |
| Pregelatinized corn flour | 3.0 |
| Hydrochloric acid | 2.0 |
| Emulsifier (Atmos 300) | 0.5 |
| Ethoxyquin | 0.2 |
| Sodium benzoate | 0.125 |
| Calcium propionate | 0.125 |
| Additional antioxidant (Tenox 6) | 0.05 |

A cereal mixture was prepared by admixing the following ingredients:

| Ingredients | Parts by Weight |
| --- | --- |
| Poultry meal | 24.0 |
| Whole yellow corn | 17.8 |
| Dehulled soybean meal | 16.4 |
| Oat groats | 13.0 |
| Wheat | 12.5 |
| Propylene glycol | 5.0 |
| Phosphoric acid | 2.0 |
| Water | 1.0 |
| Salt | .8 |
| Vitamins, minerals, color, flavoring | 7.5 |

The meaty filling and cereal covering were placed in an extruder as shown in U.S. Pat. No. 3,764,715. The product was extruded with the cereal slightly expanding about the centerfilling upon extrusion. The product was crimped into pillow-shaped particles about ¾ to 1 inch long. The water activity, $A_w$, of the filling was found to be 0.97 and the pH of the filling was found to be about 4.13. The product was highly acceptable as a cat food and was shelf stable against mold and bacterial growth.

Example 9

A quantity of pork liver was crushed and cooked in a pressure cooker. The pork liver was mixed with other ingredients to give a formula having the following composition:

| Ingredients | Parts by Weight |
| --- | --- |
| Pork liver | 90.00 |
| Animal fat (choice white grease) | 4.0 |
| Pregelatinized corn flour | 3.0 |
| Phosphoric acid | 2.0 |
| Emulsifier (Atmos 300) | 0.5 |
| Ethoxyquin | 0.2 |
| Sodium benzoate | 0.125 |
| Calcium propionate | 0.125 |
| Additional antioxidant (Tenox 6) | 0.05 |

A cereal mixture was prepared by admixing the following ingredients:

| Ingredients | Parts by Weight |
| --- | --- |
| Poultry meal | 24.0 |
| Whole yellow corn | 17.8 |
| Dehulled soybean meal | 16.4 |
| Oat groats | 13.0 |
| Wheat | 12.5 |
| Propylene glycol | 5.0 |
| Phosphoric acid | 2.0 |
| Water | 1.0 |
| Salt | .8 |
| Vitamins, minerals, color, flavoring | 7.5 |

The meaty filling and cereal covering were placed in an extruder as shown in U.S. Pat. No. 3,764,715. The product was extruded with the cereal slighly expanding about the centerfilling upon extrusion. The product was crimped into pillow-shaped particles about ¾ to 1 inch long. The water activity, $A_w$, of the filling was found to be 0.98 and the pH of the filling was found to be about 4.0. The product was highly acceptable as a cat food and was shelf stable against mold and bacterial growth.

Example 10

Pork liver was crushed and cooked in a pressure cooker. The pork liver was admixed with other ingredients to give the following composition:

| Ingredients | Parts by Weight |
| --- | --- |
| Pork liver | 95.00 |
| Phosphoric acid | 2.25 |
| Ethoxyquin | 0.20 |
| Sodium benzoate | 0.10 |
| Calcium propionate | 0.125 |
| Antioxidant (Tenox 6) | 0.05 |
| Gelatinized corn starch | 1.275 |

A cereal mixture was prepared by admixing the following ingredients:

| Ingredients | Parts by Weight |
| --- | --- |
| Poultry meal | 24.0 |
| Whole yellow corn | 17.8 |
| Dehulled soybean meal | 16.4 |
| Oat groats | 13.0 |
| Wheat | 12.5 |
| Propylene glycol | 5.0 |
| Phosphoric acid | 2.0 |

| Ingredients | Parts by Weight |
| --- | --- |
| Water | 1.0 |
| Salt | .8 |
| Vitamins, minerals, color, flavoring | 7.5 |

The meaty filling and cereal covering were placed in an extruder as shown in U.S. Pat. No. 3,764,715. The product was extruded with the cereal slightly expanding about the centerfilling upon extrusion. The product was crimped into pillow-shaped particles about ¾ to 1 inch long. The water activity, $A_w$, of the filling was found to be 0.99. The product was highly acceptable as a cat food and was shelf stable against mold and bacterial growth.

Example 11

A fish base was prepared comprising a mixture of equal parts of skipjack tuna, flounder and shrimp. The fish parts were thoroughly mixed together and cooked in a pressure cooker. The cooked fish was then admixed with other ingredients in amounts as follows:

| Ingredients | Parts By Weight |
| --- | --- |
| Fish | 90.00 |
| Adipic acid | 2.75 |
| Gelatinized corn flour | 3.125 |
| Animal fat (choice white grease) | 3.00 |
| Emulsifier (Atmos 300) | 0.50 |
| Ethoxyquin | 0.20 |
| Sodium benzoate | 0.10 |
| Calcium propionate | 0.275 |
| Additional antioxidant (Tenox 6) | 0.05 |

A cereal mixture was prepared by admixing the following ingredients:

| Ingredients | Parts by Weight |
| --- | --- |
| Poultry meal | 24.0 |
| Whole yellow corn | 17.8 |
| Dehulled soybean meal | 16.4 |
| Oat groats | 13.0 |
| Wheat | 12.5 |
| Propylene glycol | 5.0 |
| Phosphoric acid | 2.0 |
| Water | 1.0 |
| Salt | .8 |
| Vitamins, minerals, color, flavoring | 7.5 |

The meaty filling and cereal covering were placed in an extruder as shown in U.S. Pat. No. 3,764,715. The product was extruded with the cereal slightly expanding about the centerfilling upon extrusion. The product was crimped into pillow-shaped particles about ¾ to 1 inch long. The water activity, $A_w$, of the filling was found to be 0.99 and the pH of the filling was found to be about 5.0. The product was highly acceptable as a cat food and was shelf stable against mold and bacterial growth.

Example 12

A fish base was prepared comprising a mixture of equal parts of skipjack tuna, flounder and shrimp. The fish parts were thoroughly mixed together and cooked in a pressure cooker. The cooked fish was then admixed with other ingredients in amounts as follows:

| Ingredients | Parts By Weight |
| --- | --- |
| Fish | 90.00 |
| Succinic acid | 2.85 |
| Gelatinized corn flour | 3.475 |
| Animal fat (choice white grease) | 2.40 |
| Emulsifier (Atmos 300) | 0.50 |
| Ethoxyquin | 0.20 |
| Sodium benzoate | 0.10 |
| Calcium propionate | 0.275 |
| Additional antioxidant (Tenox 6) | 0.05 |

A cereal mixture was prepared by admixing the following ingredients:

| Ingredients | Parts by Weight |
| --- | --- |
| Poultry meal | 24.0 |
| Whole yellow corn | 17.8 |
| Dehulled soybean meal | 16.4 |
| Oat groats | 13.0 |
| Wheat | 12.5 |
| Propylene glycol | 5.0 |
| Phosphoric acid | 2.0 |
| Water | 1.0 |
| Salt | .8 |
| Vitamins, minerals, color, flavoring | 7.5 |

The meaty filling and cereal covering were placed in an extruder as shown in U.S. Pat. No. 3,764,715. The product was extruded with the cereal slightly expanding about the centerfilling upon extrusion. The product was crimped into pillow-shaped particles about ¾ to 1 inch long. The water activity, $A_w$, of the filling was found to be 0.99 and the pH of the filling was found to be about 4.53. The product was highly acceptable as a cat food and was shelf stable against mold and bacterial growth.

Example 13

A fish base was prepared comprising a mixture of equal parts of skipjack tuna, flounder and shrimp. The fish parts were thoroughly mixed together and cooked in a pressure cooker. The cooked fish was then admixed with other ingredients in amounts as follows:

| Ingredients | Parts By Weight |
| --- | --- |
| Fish | 90.00 |
| Fumaric acid | 2.75 |
| Gelatinized corn flour | 3.125 |
| Animal fat (choice white grease) | 3.00 |
| Emulsifier (Atmos 300) | 0.50 |
| Ethoxyquin | 0.20 |
| Sodium benzoate | 0.10 |
| Calcium propionate | 0.275 |
| Additional antioxidant (Tenox 6) | 0.05 |

A cereal mixture was prepared by admixing the following ingredients:

| Ingredients | Parts by Weight |
| --- | --- |
| Poultry meal | 24.0 |
| Whole yellow corn | 17.8 |
| Dehulled soybean meal | 16.4 |
| Oat groats | 13.0 |
| Wheat | 12.5 |
| Propylene glycol | 5.0 |
| Phosphoric acid | 2.0 |
| Water | 1.0 |
| Salt | .8 |
| Vitamins, minerals, color, flavoring | 7.5 |

The meaty filling and cereal covering were placed in an extruder as shown in U.S. Pat. No. 3,764,715. The product was extruded with the cereal slightly expanding about the centerfilling upon extrusion. The product was crimped into pillow-shaped particles about ¾ to 1 inch long. The water activity, $A_w$, of the filling was found to be 0.99 and the pH of the filling was found to be about 4.27. The product was highly acceptable as a cat food and was shelf stable against mold and bacterial growth.

Example 14

A fish base was prepared comprising a mixture of equal parts of skipjack tuna, flounder and shrimp. The fish parts were thoroughly mixed together and cooked in a pressure cooker. The cooked fish was then admixed with other ingredience in amounts as follows:

| Ingredients | Parts by Weight |
|---|---|
| Fish | 90.00 |
| Citric acid | 2.75 |
| Gelatinized corn flour | 3.125 |
| Animal fat (choice white grease) | 3.00 |
| Emulsifier (Atmos 300) | 0.50 |
| Ethoxyquin | 0.20 |
| Sodium benzoate | 0.10 |
| Calcium propionate | 0.275 |
| Additional antioxidant (Tenox 6) | 0.05 |

A cereal mixture was prepared by admixing the following ingredients:

| Ingredients | Parts by Weight |
|---|---|
| Poultry meal | 24.0 |
| Whole yellow corn | 17.8 |
| Dehulled soybean meal | 16.4 |
| Oat groats | 13.0 |
| Wheat | 12.5 |
| Propylene glycol | 5.0 |
| Phosphoric acid | 2.0 |
| Water | 1.0 |
| Salt | .8 |
| Vitamins, minerals, color, flavoring | 7.5 |

The meaty filling and cereal covering were placed in an extruder as shown in U.S. Pat. No. 3,764,715. The product was extruded with the cereal slightly expanding about the centerfilling upon extrusion. The product was crimped into pillow-shaped particles about ¾ to 1 inch long. The filling was found to have a pH of 4.50 and a water activity, $A_w$, of 0.99. The product was highly acceptable as a cat food and was shelf stable against mold and bacterial growth.

Example 15

A fish base was prepared comprising a mixture of equal parts of skipjack tuna, flounder and shrimp. The fish parts were thoroughly mixed together and cooked in a pressure cooker. The cooked fish was then admixed with other ingredients in amounts as follows:

| Ingredients | Parts by Weight |
|---|---|
| Fish | 90.00 |
| Tartaric acid | 2.50 |
| Gelatinized corn flour | 3.375 |
| Animal fat (choice white grease) | 3.00 |
| Emulsifier (Atmos 300) | 0.50 |
| Ethoxyquin | 0.20 |
| Sodium benzoate | 0.10 |
| Calcium propionate | 0.275 |
| Additional antioxidant (Tenox 6) | 0.05 |

A cereal mixture was prepared by admixing the following ingredients:

| Ingredients | Parts by Weight |
|---|---|
| Poultry meal | 24.0 |
| Whole yellow corn | 17.8 |
| Dehulled soybean meal | 16.4 |
| Oat groats | 13.0 |
| Wheat | 12.5 |
| Propylene glycol | 5.0 |
| Phosphoric acid | 2.0 |
| Water | 1.0 |
| Salt | .8 |
| Vitamins, minerals, color, flavoring | 7.5 |

The meaty filling and cereal covering were placed in an extruder as shown in U.S. Pat. No. 3,764,715. The product was extruded with the cereal slightly expanding about the centerfilling upon extrusion. The product was crimped into pillow-shaped particles about ¾ to 1 inch long. The filling was found to have a pH of 4.68 and a water activity, $A_w$, of 0.99. The product was highly acceptable as a cat food and was shelf stable against mold and bacterial growth.

Example 16

A fish base was prepared comprising a mixture of equal parts of skipjack tuna, flounder and shrimp. The fish parts were thoroughly mixed together and cooked in a pressure cooker. The cooked fish was then admixed with other ingredients in amounts as follows:

| Ingredients | Parts by Weight |
|---|---|
| Fish | 90.00 |
| Acetic acid | 2.50 |
| Gelatinized corn flour | 3.125 |
| Animal fat (choice white grease) | 3.25 |
| Emulsifier (Atmos 300) | 0.50 |
| Ethoxyquin | 0.20 |
| Sodium benzoate | 0.10 |
| Calcium propionate | 0.275 |
| Additional antioxidant (Tenox 6) | 0.05 |

A cereal mixture was prepared by admixing the following ingredients:

| Ingredients | parts by Weight |
|---|---|
| Poultry meal | 24.0 |
| Whole yellow corn | 17.8 |
| Dehulled soybean meal | 16.4 |
| Oat groats | 13.0 |
| Wheat | 12.5 |
| Propylene glycol | 5.0 |
| Phosphoric acid | 2.0 |
| Water | 1.0 |
| Salt | .8 |
| Vitamins, minerals, color, flavoring | 7.5 |

The meaty filling and cereal covering were placed in an extruder as shown in U.S. Pat. No. 3,764,715. The product was extruded with the cereal slightly expanding about the centerfilling upon extrusion. The product was crimped into pillow-shaped particles about ¾ to 1 inch long. The filling was found to have a pH of 4.65 and a water activity, $A_w$, of 0.99. The product was highly acceptable as a cat food and was shelf stable against mold and bacterial growth.

Example 17

A fish base was prepared comprising a mixture of equal parts of skipjack tuna, flounder and shrimp. The fish parts were thoroughly mixed together and cooked in a pressure cooker. The cooked fish was then admixed with other ingredients in amounts as follows:

| Ingredients | parts by Weight |
| --- | --- |
| Fish | 90.00 |
| Hydrochloric acid | 3.50 |
| Gelatinized corn flour | 2.50 |
| Animal fat (choice white grease) | 2.625 |
| Emulsifier (Atmos 300) | 0.50 |
| Ethoxyquin | 0.20 |
| Sodium benzoate | 0.10 |
| Calcium propionate | 0.275 |
| Additional antioxidant (Tenox 6) | 0.05 |

A cereal mixture was prepared by admixing the following ingredients:

| Ingredients | Parts by Weight |
| --- | --- |
| Poultry meal | 24.0 |
| Whole yellow corn | 17.8 |
| Dehulled soybean meal | 16.4 |
| Oat groats | 13.0 |
| Wheat | 12.5 |
| Propylene glycol | 5.0 |
| Phosphoric acid | 2.0 |
| Water | 1.0 |
| Salt | .8 |
| Vitamins, minerals, color, flavoring | 7.5 |

The meaty filling and cereal covering were placed in an extruder as shown in U.S. Pat. No. 3,764,715. The product was extruded with the cereal slightly expanding about the centerfilling upon extrusion. The product was crimped into pillow-shaped particles about ¾ to 1 inch long. The filling was found to have a pH of 3.90 and a water activity, $A_w$, of 0.99. The product was highly acceptable as a cat food and was shelf stable against mold and bacterial growth.

Example 18

A fish base was prepared comprising a mixture of equal parts of skipjack tuna, flounder and shrimp. The fish parts were thoroughly mixed together and cooked in a pressure cooker. The cooked fish was then admixed with other ingredients in amounts as follows:

| Ingredients | Parts by Weight |
| --- | --- |
| Fish | 90.00 |
| Phosphoric acid | 3.75 |
| Gelatinized corn flour | 2.625 |
| Animal fat (choice white grease) | 2.50 |
| Emulsifier (Atmos 300) | 0.50 |
| Ethoxyquin | 0.20 |
| Sodium benzoate | 0.10 |
| Calcium propionate | 0.275 |
| Additional antioxidant (Tenox 6) | 0.05 |

A cereal mixture was prepared by admixing the following ingredients:

| Ingredients | Parts by Weight |
| --- | --- |
| Poultry meal | 24.0 |
| Whole yellow corn | 17.8 |
| Dehulled soybean meal | 16.4 |
| Oat groats | 13.0 |
| Wheat | 12.5 |
| Propylene glycol | 5.0 |
| Phosphoric acid | 2.0 |
| Water | 1.0 |
| Salt | .8 |
| Vitamins, minerals, color, flavoring | 7.5 |

The meaty filling and cereal covering were placed in an extruder as shown in U.S. Pat. No. 3,764,715. The product was extruded with the cereal slightly expanding about the centerfilling upon extrusion. The product was crimped into pillow-shaped particles about ¾ to 1 inch long. The filling was found to have a pH of 3.75 and a water activity, $A_w$, of 0.99. The product was highly acceptable as a cat food and was shelf stable against mold and bacterial growth.

Example 19

Skipjack tuna was ground and cooked in a pressure cooker. The cooked fish was then admixed with other ingredients in amounts as follows:

| Ingredients | Parts by Weight |
| --- | --- |
| Skipjack tuna | 90.00 |
| Adipic acid | 2.75 |
| Gelatinized corn flour | 3.025 |
| Animal fat (choice white grease) | 2.50 |
| Emulsifier (Atmos 300) | 0.50 |
| Ethoxyquin | 0.20 |
| Sodium benzoate | 0.10 |
| Calcium propionate | 0.275 |
| Additional antioxidant (Tenox 6) | 0.05 |

A cereal mixture was prepared by admixing the following ingredients:

| Ingredients | Parts by Weight |
| --- | --- |
| Poultry meal | 24.0 |
| Whole yellow corn | 17.8 |
| Dehulled soybean meal | 16.4 |
| Oat groats | 13.0 |
| Wheat | 12.5 |
| Propylene glycol | 5.0 |
| Phosphoric acid | 2.0 |
| Water | 1.0 |
| Salt | .8 |
| Vitamins, minerals, coloring, flavoring | 7.5 |

The meaty filling and cereal covering were placed in an extruder as shown in U.S. Pat. No. 3,764,715. The product was extruded with the cereal slightly expanding about the centerfilling upon extrusion. The product was crimped into pillow-shaped particles about ¾ to 1 inch long. The filling was found to have a pH of 5.01 and a water activity, $A_w$, of 0.99. The filling had a moisture content of about 59 percent by weight. The product was highly acceptable as a cat food and was shelf stable against mold and bacterial growth.

Example 20

Skipjack tuna was ground and cooked in a pressure cooker. The cooked fish was then admixed with other ingredients in amounts as follows:

| Ingredients | Parts by Weight |
|---|---|
| Skipjack tuna | 90.00 |
| Succinic acid | 2.85 |
| Gelatinized corn flour | 3.625 |
| Animal fat (choice white grease) | 2.50 |
| Emulsifier (Atmos 300) | 0.50 |
| Ethoxyquin | 0.20 |
| Sodium benzoate | 0.10 |
| Calcium propionate | 0.275 |
| Additional antioxidant (Tenox 6) | 0.05 |

A cereal mixture was prepared by admixing the following ingredients:

| Ingredients | Parts by Weight |
|---|---|
| Poultry meal | 24.0 |
| Whole yellow corn | 17.8 |
| Dehulled soybean meal | 16.4 |
| Oat groats | 13.0 |
| Wheat | 12.5 |
| Propylene glycol | 5.0 |
| Phosphoric acid | 2.0 |
| Water | 1.0 |
| Salt | .8 |
| Vitamins, Minerals, color, flavoring | 7.5 |

The meaty filling and cereal covering were placed in an extruder as shown in U.S. Pat. No. 3,764,715. The product was extruded with the cereal slightly expanding about the centerfilling upon extrusion. The product was crimped into pillow-shaped particles about ¾ to 1 inch long. The filling was found to have a pH of 4.25 and a water activity, $A_w$, of 0.99+. The product was highly acceptable as a cat food and was shelf stable against mold and bacterial growth.

Example 21

Skipjack tuna was ground and cooked in a pressure cooker. The cooked fish was then admixed with other ingredients in amounts as follows:

| Ingredients | Part by Weight |
|---|---|
| Skipjack tuna | 90.00 |
| Fumaric acid | 2.75 |
| Gelatinized corn flour | 3.625 |
| Animal fat (choice white grease) | 2.50 |
| Emulsifier (Atmos 300) | 0.50 |
| Ethoxyquin | 0.20 |
| Sodium benzoate | 0.10 |
| Calcium propionate | 0.275 |
| Additional antioxidant (Tenox 6) | 0.05 |

A cereal mixture was prepared by admixing the following ingredients:

| Ingredients | Parts by Weight |
|---|---|
| Poultry meal | 24.0 |
| Whole yellow corn | 17.8 |
| Dehulled soybean meal | 16.4 |
| Oat groats | 13.0 |
| Wheat | 12.5 |
| Propylene glycol | 5.0 |
| Phosphoric acid | 2.0 |
| Water | 1.0 |
| Salt | .8 |
| Vitamins, minerals, color, flavoring | 7.5 |

The meaty filling and cereal covering were placed in an extruder as shown in U.S. Pat. No. 3,764,715. The product was extruded with the cereal slightly expanding about the centerfilling upon extrusion. The product was crimped into pillow-shaped particles about ¾ to 1 inch long. The filling was found to have a pH of 4.25 and a water activity, $A_w$, of 0.98. The product was highly acceptable as a cat food and was shelf stable against mold and bacterial growth.

Example 22

Skipjack tuna was ground and cooked in a pressure cooker. The cooked fish was then admixed with other ingredients in amounts as follows:

| Ingredients | Parts by Weight |
|---|---|
| Skipjack tuna | 90.00 |
| Malic acid | 2.75 |
| Gelatinized corn flour | 3.625 |
| Animal fat (choice white grease) | 2.50 |
| Emulsifier (Atmos 300) | 0.50 |
| Ethoxyquin | 0.20 |
| Sodium benzoate | 0.10 |
| Calcium propionate | 0.275 |
| Additional antioxidant (Tenox 6) | 0.05 |

A cereal mixture was prepared by admixing the following ingredients;

| Ingredients | Parts by Weight |
|---|---|
| Poultry meal | 24.0 |
| Whole yellow corn | 17.8 |
| Dehulled soybean meal | 16.4 |
| Oat groats | 13.0 |
| Wheat | 12.5 |
| Propylene glycol | 5.0 |
| Phosphoric acid | 2.0 |
| Water | 1.0 |
| Salt | .8 |
| Vitamins, minerals, color, flavoring | 7.5 |

The meaty filling and cereal covering were placed in an extruder as shown in U.S. Pat. No. 3,764,715. The product was extruded with the cereal slightly expanding about the centerfilling upon extrusion. The product was crimped into pillow-shaped particles about ¾ to 1 inch long. The filling was found to have a pH of 4.22 and a water activity, $A_w$, of about 0.99. The filling had a moisture content of about 59 percent by weight. The product was highly acceptable as a cat food and was shelf stable against mold and bacterial growth.

Example 23

Skipjack tuna was ground and cooked in a pressure cooker. The cooked fish was then admixed with other ingredients in amounts as follows:

| Ingredients | Parts by Weight |
| --- | --- |
| Skipjack tuna | 90.00 |
| Citric acid | 3.0 |
| Gelatinized corn flour | 3.375 |
| Animal fat (choice white grease) | 2.75 |
| Emulsifier (Atmos 300) | 0.50 |
| Ethoxyquin | 0.20 |
| Sodium benzoate | 0.10 |
| Calcium propionate | 0.275 |
| Additional antioxidant (Tenox 6) | 0.05 |

A cereal mixture was prepared by admixing the following ingredients:

| Ingredients | Parts by Weight |
| --- | --- |
| Poultry meal | 24.0 |
| Whole yellow corn | 17.8 |
| Dehulled soybean meal | 16.4 |
| Oat groats | 13.0 |
| Wheat | 12.5 |
| Propylene glycol | 5.0 |
| Phosphoric acid | 2.0 |
| Water | 1.0 |
| Salt | .8 |
| Vitamins, minerals, color, flavoring | 7.5 |

The meaty filling and cereal covering were placed in an extruder as shown in U.S. Pat. No. 3,764,715. The product was extruded with the cereal slightly expanding about the centerfilling upon extrusion. The product was crimped into pillow-shaped particles about ¾ to 1 inch long. The filling was found to have a Ph of 4.05 and a water content of about 59 percent by weight. The product was highly acceptable as a cat food and was shelf stable against mold and bacterial growth.

Example 24

Skipjack tuna was ground and cooked in a pressure cooker. The cooked fish was then admixed with other ingredients in the amount as follows:

| Ingredients | Parts by Weight |
| --- | --- |
| Fish | 90.00 |
| Tartaric acid | 2.75 |
| Gelatinized corn flour | 3.375 |
| Animal fat (choice white grease) | 3.00 |
| Emulsifier (Atmos 300) | 0.50 |
| Ethoxyquin | 0.20 |
| Sodium benzoate | 0.10 |
| Calcium propionate | 0.275 |
| Additional antioxidant (Tenox 6) | 0.05 |

A cereal mixture was prepared by admixing the following ingredients:

| Ingredients | Parts by Weight |
| --- | --- |
| Poultry meal | 24.0 |
| Whole yellow corn | 17.8 |
| Dehulled soybean meal | 16.4 |
| Oat groats | 13.0 |
| Wheat | 12.5 |
| Propylene glycol | 5.0 |
| Phosphoric acid | 2.0 |
| Water | 1.0 |
| Salt | .8 |
| Vitamins, minerals, color, flavoring | 7.5 |

The meaty filling and cereal covering were placed in an extruder as shown in U.S. Pat. No. 3,764,715. The product was extruded with the cereal slightly expanding about the centerfilling upon extrusion. The product was crimped into pillow-shaped particles about ¾ to 1 inch long. The filling was found to have a pH of 4.30 and a water content of about 59 percent by weight. The product was highly acceptable as a cat food and was shelf stable against mold and bacterial growth.

Example 25

Skipjack tuna was ground and cooked in a pressure cooker. The cooked fish was then admixed with other ingredients in amounts as follows:

| Ingredients | Parts by Weight |
| --- | --- |
| Fish | 90.00 |
| Acetic acid | 2.50 |
| Gelatinized corn flour | 3.375 |
| Animal fat (choice white grease) | 3.00 |
| Emulsifier (Atmos 300) | 0.50 |
| Ethoxyquin | 0.20 |
| Sodium benzoate | 0.10 |
| Calcium propionate | 0.275 |
| Additional antioxidant (Tenox 6) | 0.05 |

A cereal mixture was prepared by admixing the following ingredients:

| Ingredients | Parts by Weight |
| --- | --- |
| Poultry meal | 24.0 |
| Whole yellow corn | 17.8 |
| Dehulled soybean meal | 16.4 |
| Oat groats | 13.0 |
| Wheat | 12.5 |
| Propylene glycol | 5.0 |
| Phosphoric acid | 2.0 |
| Water | 1.0 |
| Salt | .8 |
| Vitamins, minerals, color, flavoring | 7.5 |

The meaty filling and cereal covering were placed in an extruder as shown in U.S. Pat. No. 3,764,715. The product was extruded with the cereal slightly expanding about the centerfilling upon extrusion. The product was crimped into pillow-shaped particles about ¾ to 1 inch long. The filling was found to have a pH of 4.84 and a water activity, $A_w$, of about 0.97. The product was highly acceptable as a cat food and was shelf stable against mold and bacterial growth.

Example 26

Skipjack tuna was ground and cooked in a pressure cooker. The cooked fish was then admixed with other ingredients in amounts as follows:

| Ingredients | Parts by Weight |
| --- | --- |
| Fish | 90.00 |
| Hydrochloric acid | 3.50 |
| Gelatinized corn flour | 2.75 |
| Animal fat (choice white grease) | 2.625 |
| Emulsifier (Atmos 300) | 0.50 |

-continued

| Ingredients | Parts by Weight |
|---|---|
| Ethoxyquin | 0.20 |
| Sodium benzoate | 0.10 |
| Calcium propionate | 0.275 |
| Additional antioxidant (Tenox 6) | 0.05 |

A cereal mixture was prepared by admixing the following ingredients:

| Ingredients | Parts by Weight |
|---|---|
| Poultry meal | 24.0 |
| Whole yellow corn | 17.8 |
| Dehulled soybean meal | 16.4 |
| Oat groats | 13.0 |
| Wheat | 12.5 |
| Propylene glycol | 5.0 |
| Phosphoric acid | 2.0 |
| Water | 1.0 |
| Salt | .8 |
| Vitamins, minerals, color, flavoring | 7.5 |

The meaty filling and cereal covering were placed in an extruder as shown in U.S. Pat. No. 3,764,715. The product was extruded with the cereal slightly expanding about the centerfilling upon extrusion. The product was crimped into pillow-shaped particles about ¾ to 1 inch long. The filling was found to have a pH of 3.90 and a water content of about 59 percent by weight. The product was highly acceptable as a cat food and was shelf stable against mold and bacterial growth.

Example 27

Skipjack tuna was gound and cooked in a pressure cooker. The cooked fish was then admixed with other ingredients in amounts as follows:

| Ingredients | Parts by Weight |
|---|---|
| Fish | 90.00 |
| Phosphoric acid | 3.75 |
| Gelatinized corn flour | 2.625 |
| Animal fat (choice white grease) | 2.50 |
| Emulsifier (Atmos 300) | 0.50 |
| Ethoxyquin | 0.20 |
| sodium benzoate | 0.10 |
| Calcium propionate | 0.275 |
| Additional antioxidant (Tenox 6) | 0.05 |

A cereal mixture was prepared by admixing the following ingredients:

| Ingredients | Parts by Weights |
|---|---|
| Poultry meal | 24.0 |
| Whole yellow corn | 17.8 |
| Dehulled soybean meal | 16.4 |
| Oat groats | 13.0 |
| Wheat | 12.5 |
| Propylene glycol | 5.0 |
| Phosphoric acid | 2.0 |
| Water | 1.0 |
| Salt | .8 |
| Vitamins, minerals, color, flavoring | 7.5 |

The meaty filling and cereal covering were placed in an extruder as shown in U.S. Pat. No. 3,764,715. The product was extruded with the cereal slightly expanding about the centerfilling upon extrusion. The product was crimped into pillow-shaped particles about ¾ to 1 long. The filling was found to have a pH of 3.97 and a water content of about 59 percent by weight. The product was highly acceptable as a cat food and was shelf stable against mold and bacterial growth.

Example 28

A fish material was prepared by grinding and cooking flounder. The cooked flounder was admixed with other ingredients to give the following composition:

| Ingredients | Parts by Weight |
|---|---|
| Flounder | 90.00 |
| Adipic acid | 2.00 |
| Gelatinized corn flour | 3.175 |
| Animal fat (choice white grease) | 3.70 |
| Emulsifier (Atmos 300) | 0.50 |
| Ethoxyquin | 0.20 |
| Sodium benzoate | 0.10 |
| Calcium propionate | 0.275 |
| Additional antioxidant (Tenox 6) | 0.05 |

A cereal mixture was prepared by admixing the following ingredients:

| Ingredients | Parts by Weight |
|---|---|
| Poultry meal | 24.0 |
| Whole yellow corn | 17.8 |
| Dehulled soybean meal | 16.4 |
| Oat groats | 13.0 |
| Wheat | 12.5 |
| Propylene glycol | 5.0 |
| Phosphoric acid | 2.0 |
| Water | 1.0 |
| Salt | .8 |
| Vitamins, minerals, color, flavoring | 7.5 |

The meaty filling and cereal covering were placed in an extruder as shown in U.S. Pat. No. 3,764,715. The product was extruded with the cereal slightly expanding about the centerfilling upon extrusion. The product was crimped into pillow-shaped particles about ¾ to 1 long. The filling had a pH of 4.87 and a moisture content of about 56 percent by weight.

Example 29

A fish material was prepared by grinding and cooking flounder. The cooked flounder was admixed with other ingredients to give the following compositions:

| Ingredients | Parts by Weight |
|---|---|
| Flounder | 90.00 |
| Succinic acid | 3.25 |
| Gelatinized corn flour | 3.125 |
| Animal fat (choice white grease) | 3.50 |
| Ethoxyquin | 0.20 |
| Emulsifier (Atmos 300) | 0.50 |
| Sodium benzoate | 0.10 |
| Calcium propionate | 0.275 |
| Additional antioxidant (Tenox 6) | 0.05 |

A cereal mixture was prepared by admixing the following ingredients:

| Ingredients | Parts by Weight |
|---|---|
| Poultry meal | 24.0 |
| Whole yellow corn | 17.8 |
| Dehulled soybean meal | 16.4 |
| Oat groats | 13.0 |
| Wheat | 12.5 |

-continued

| Ingredients | Parts by Weight |
|---|---|
| Propylene glycol | 5.0 |
| Phosphoric acid | 2.0 |
| Water | 1.0 |
| Salt | .8 |
| Vitamins, minerals, color, flavoring | 7.5 |

The meaty filling and cereal covering were placed in an extruder as shown in U.S. Pat. No. 3,764,715. The product was extruded with the cereal slightly expanding about the centerfilling upon extrusion. The product was crimped into pillow-shaped particles about ¾ to 1 inch long. The filling had a pH of 4.56 and a moisture content of about 56 percent by weight. The product was highly acceptable as a cat food and was shelf stable against mold and bacterial growth.

Example 30

A fish material was prepared by grinding and cooking flounder. The cooked flounder was admixed with other ingredients to give the following composition:

| Ingredients | Parts by Weight |
|---|---|
| Flounder | 90.00 |
| Fumeric acid | 2.00 |
| Gelatinized corn flour | 3.375 |
| Animal fat (choice white grease) | 3.50 |
| Emulsifier (Atmos 300) | 0.50 |
| Ethoxyquin | 0.20 |
| Sodium benzoate | 0.10 |
| Calcium propionate | 0.275 |
| Additional antioxidant (Tenox 6) | 0.05 |

A cereal mixture was prepared by admixing the following ingredients:

| Ingredients | Parts by Weight |
|---|---|
| Poultry meal | 24.0 |
| Whole yellow corn | 17.8 |
| Dehulled soybean meal | 16.4 |
| Oat groats | 13.0 |
| Wheat | 12.5 |
| Propylene glycol | 5.0 |
| Phosphoric acid | 2.0 |
| Water | 1.0 |
| Salt | .8 |
| Vitamins, minerals, color, flavoring | 7.5 |

The meaty filling and cereal covering were placed in an extruder as shown in U.S. Pat. No. 3,764,715. The product was extruded with the cereal slightly expanding about the centerfilling upon extrusion. The product was crimped into pillow-shaped particles about ¾ to 1 inch long. The filling had a pH of 4.22 and a moisture content of about 56 percent by weight. The product was highly acceptable as a cat food and was shelf stable against mold and bacterial growth.

Example 31

A fish material was prepared by grinding and cooking flounder. The cooked flounder was admixed with other ingredients to give the following composition:

| Ingredients | Parts by Weight |
|---|---|
| Flounder | 90.00 |
| Malseic acid | 2.25 |
| Gelatinized corn flour | 3.125 |
| Animal fat (choice white grease) | 3.50 |
| Emulsifier (Atmos 300) | 0.50 |
| Ethoxyquin | 0.20 |
| Sodium benzoate | 0.10 |
| Calcium propionate | 0.275 |
| Additional antioxidant (Tenox 6) | 0.05 |

A cereal mixture was prepared by admixing the following ingredients:

| Ingredients | Parts by Weight |
|---|---|
| Poultry meal | 24.0 |
| Whole yellow corn | 17.8 |
| Dehulled soybean meal | 16.4 |
| Oat groats | 13.0 |
| Wheat | 12.5 |
| Propylene glycol | 5.0 |
| Phosphoric acid | 2.0 |
| Water | 1.0 |
| Salt | .8 |
| Vitamins, minerals, color, flavoring | 7.5 |

The meaty filling and cereal covering were placed in an extruder as shown in U.S. Pat. No. 3,764,715. The product was extruded with the cereal slightly expanding about the centerfilling upon extrusion. The product was crimped into pillow-shaped particles about ¾ to 1 inch long. The filling had a pH of 4.29 and a moisture content of about 56 percent by weight. The product was highly acceptable as a cat food and was shelf stable against mold and bacterial growth.

Example 32

A fish material was prepared by grinding and cooking flounder. The cooked flounder was admixed with other ingredients to give the following composition:

| Ingredients | Parts by Weight |
|---|---|
| Flounder | 90.00 |
| Tartaric acid | 2.50 |
| Gelatinized corn flour | 3.075 |
| Animal fat (choice white grease) | 3.30 |
| Emulsifier (Atmos 300) | 0.50 |
| Ethoxyquin | 0.20 |
| Sodium benzoate | 0.10 |
| Calcium propionate | 0.275 |
| Additional antioxidant (Tenox 6) | 0.05 |

The meaty filling and cereal covering were placed in an extruder as shown in U.S. Pat. No. 3,764,715. The product was extruded with the cereal slightly expanding about the centerfilling upon extrusion. The product was crimped into pillow-shaped particles about ¾ to 1 inch long. The filling had a pH of 4.34 and a moisture content of about 56 percent by weight. The product was highly acceptable as a cat food and was shelf stable against mold and bacterial growth.

Example 33

A fish material was prepared by grinding and cooking flounder. The cooked flounder was admixed with other ingredients to give the following composition:

| Ingredients | Parts by Weight |
| --- | --- |
| Flounder | 90.00 |
| Acetic acid | 1.75 |
| Gelatinized corn flour | 3.45 |
| Animal fat (choice white grease) | 3.675 |
| Emulsifier (Atmos 300) | 0.50 |
| Ethoxyquin | 0.20 |
| Sodium benzoate | 0.10 |
| Calcium propionate | 0.275 |
| Additional antioxidant (Tenox 6) | 0.05 |

A cereal mixture was prepared by admixing the following ingredients:

| Ingredients | Parts by Weight |
| --- | --- |
| Poultry meal | 24.0 |
| Whole yellow corn | 17.8 |
| Dehulled soybean meal | 16.4 |
| Oat groats | 13.0 |
| Wheat | 12.5 |
| Propylene glycol | 5.0 |
| Phosphoric acid | 2.0 |
| Water | 1.0 |
| Salt | .8 |
| Vitamins, minerals, color, flavoring | 7.5 |

The meaty filling and cereal covering were placed in an extruder as shown in U.S. Pat. No. 3,764,715. The product was extruded with the cereal slightly expanding about the centerfilling upon extrusion. The product was crimped into pillow-shaped particles about ¾ to 1 inch long. The filling had a pH of 4.43 and a moisture content of about 56 percent by weight. The product was highly acceptable as a cat food and was shelf stable against mold and bacterial growth.

Example 34

A fish material was prepared by grinding and cooking flounder. The cooked flounder was admixed with other ingredients to give the following composition:

| Ingredients | Parts by Weight |
| --- | --- |
| Flounder | 90.00 |
| Hydrochloric acid | 2.10 |
| Gelatinized corn flour | 2.275 |
| Animal fat (choice white grease) | 3.50 |
| Emulsifier (Atmos 300) | 0.50 |
| Ethoxyquin | 0.20 |
| Sodium benzoate | 0.10 |
| Calcium propionate | 0.275 |
| Additional antioxidant (Tenox 6) | 0.05 |

A cereal mixture was prepared by admixing the following ingredients:

| Ingredients | Parts by Weight |
| --- | --- |
| Poultry meal | 24.0 |
| Whole yellow corn | 17.8 |
| Dehulled soybean meal | 16.4 |
| Oat groats | 13.0 |
| Wheat | 12.5 |
| Propylene glycol | 5.0 |
| Phosphoric acid | 2.0 |
| Water | 1.0 |
| Salt | .8 |
| Vitamins, minerals, color, flavoring | 7.5 |

The meaty filling and cereal covering were placed in an extruder as shown in U.S. Pat. No. 3,764,715. The product was extruded with the cereal slightly expanding about the centerfilling upon extrusion. The product was crimped into pillow-shaped particles about ¾ to 1 inch long. The filling had a pH of 4.29 and a moisture content of about 56 percent by weight. The product was highly acceptable as a cat food and was shelf stable against mold and bacterial growth.

Example 35

A fish material was prepared by grinding and cooking flounder. The cooked flounder was admixed with other ingredients to give the following composition:

| Ingredients | Parts by Weight |
| --- | --- |
| Flounder | 90.00 |
| Phosphoric acid | 2.15 |
| Gelatinized corn flour | 3.225 |
| Animal fat (choice white grease) | 3.50 |
| Emulsifier (Atmos 300) | 0.50 |
| Ethoxyquin | 0.20 |
| Sodium Benzoate | 0.10 |
| Calcium propionate | 0.275 |
| Additional antioxidant (Tenox 6) | 0.05 |

A cereal mixture was prepared by admixing the following ingredients:

| Ingredients | Parts by Weight |
| --- | --- |
| Poultry meal | 24.0 |
| Whole yellow corn | 17.8 |
| Dehulled soybean meal | 16.4 |
| Oat groats | 13.0 |
| Wheat | 12.5 |
| Propylene glycol | 5.0 |
| Phosphoric acid | 2.0 |
| Water | 1.0 |
| Salt | .8 |
| Vitamins, minerals, color, flavoring | 7.5 |

The meaty filling and cereal covering were placed in an extruder as shown in U.S. Pat. No. 3,764,715. The product was extruded with the cereal slightly expanding about the centerfilling upon extrusion. The product was crimped into pillow-shaped particles about ¾ to 1 inch long. The filling has a pH of 4.21 and a moisture content of about 56 percent by weight. The product was highly acceptable as a cat food and was shelf stable against mold and bacterial growth.

Example 36

Approximate equal parts of chicken necks and backs were ground and cooked in a pressure cooker. The cooked chicken was admixed with other ingredients in the following proportions:

| Ingredients | Parts by Weight |
| --- | --- |
| Chicken parts | 90.00 |
| Adipic acid | 2.0 |
| Gelatinized corn flour | 3.175 |
| Animal fat (choice white grease) | 3.70 |
| Emulsifier (Atmos 300) | 0.50 |
| Ethoxyquin | 0.20 |
| Sodium benzoate | 0.10 |
| Calcium propionate | 0.275 |
| Additional antioxidant (Tenox 6) | 0.05 |

A cereal mixture was prepared by admixing the following ingredients:

| Ingredients | Parts by Weight |
| --- | --- |
| Poultry meal | 24.0 |
| Whole yellow corn | 17.8 |
| Dehulled soybean meal | 16.4 |
| Oat groats | 13.0 |
| Wheat | 12.5 |
| Propylene glycol | 5.0 |
| Phosphoric acid | 2.0 |
| Water | 1.0 |
| Salt | .8 |
| Vitamins, minerals, color, flavoring | 7.5 |

The meaty filling and cereal covering were placed in an extruder as shown in U.S. Pat. No. 3,764,715. The product was extruded with the cereal slightly expanding about the centerfilling upon extrusion. The product was crimped into pillow-shaped particles about ¾ to 1 inch long. The filling had a pH of 4.82 and a water activity, $A_w$, of about 0.97. The filling had a moisture content of about 57 percent by weight. The product was highly acceptable as a cat food and was shelf stable against mold and bacterial growth.

Example 37

Approximate equal parts of chicken necks and backs were ground and cooked in a pressure cooker. The cooked chicken was admixed with other ingredients in the following proportions:

| Ingredients | Parts by Weight |
| --- | --- |
| Chicken parts | 90.00 |
| Succinic acid | 2.25 |
| Gelatinized corn flour | 3.125 |
| Animal fat (choice white grease) | 3.50 |
| Emulsifier (Atmos 300) | 0.50 |
| Ethoxyquin | 0.20 |
| Sodium benzoate | 0.10 |
| Calcium propionate | 0.275 |
| Additional antioxidant (Tenox 6) | 0.05 |

A cereal mixture was prepared by admixing the following ingredients:

| Ingredients | Parts by Weight |
| --- | --- |
| Poultry meal | 24.0 |
| Whole yellow corn | 17.8 |
| Dehulled soybean meal | 16.4 |
| Oat groats | 13.0 |
| Wheat | 12.5 |
| Propylene glycol | 5.0 |
| Phosphoric acid | 2.0 |
| Water | 1.0 |
| Salt | .8 |
| Vitamins, minerals, color, flavoring | 7.5 |

The meaty filling and cereal covering were placed in an extruder as shown in U.S. Pat. No. 3,764,715. The product was extruded with the cereal slightly expanding about the centerfilling upon extrusion. The product was crimped into pillow-shaped particles about ¾ to 1 inch long. The filling had a pH of 4.28 and a water activity, $A_w$, of about 0.994. The filling had a moisture content of about 56 percent by weight. The product was highly acceptable as a cat food and was shelf stable against mold and bacterial growth.

Example 38

Approximate equal parts of chicken necks and backs were ground and cooked in a pressure cooker. The cooked chicken was admixed with other ingredients in the following proportions:

| Ingredients | Parts by Weight |
| --- | --- |
| Chicken parts | 90.00 |
| Adipic acid | 2.0 |
| Gelatinized corn flour | 3.375 |
| Animal fat (choice white grease) | 3.50 |
| Emulsifier (Atmos 300) | 0.50 |
| Ethoxyquin | 0.20 |
| Sodium benzoate | 0.10 |
| Calcium propionate | 0.275 |
| Additional antioxidant (Tenox 6) | 0.05 |

A cereal mixture was prepared by admixing the following ingredients:

| Ingredients | Parts by Weight |
| --- | --- |
| Poultry meal | 24.0 |
| Whole yellow corn | 17.8 |
| Dehulled soybean meal | 16.4 |
| Oat groats | 13.0 |
| Wheat | 12.5 |
| Propylene glycol | 5.0 |
| Phosphoric acid | 2.0 |
| Water | 1.0 |
| Salt | .8 |
| Vitamins, minerals, color flavoring | 7.5 |

The meaty filling and cereal covering were placed in an extruder as shown in U.S. Pat. No. 3,764,715. The product was extruded with the cereal slightly expanding about the centerfilling upon extrusion. The product was crimped into pillow-shaped particles about ¾ to 1 inch long. The filling had a pH of 4.02 and a water activity, $A_w$, of about 0.98. The filling had a moisture content of about 56 percent by weight. The product was highly acceptable as a cat food and was shelf stable against mold and bacterial growth.

Example 39

Approximate equal parts of chicken necks and backs were ground and cooked in a pressure cooker. The cooked chicken was admixed with other ingredients in the following proportions:

| Ingredients | Parts by Weight |
| --- | --- |
| Chicken parts | 90.00 |
| Maleic acid | 2.25 |
| Gelatinized corn flour | 3.075 |
| Animal fat (choice white grease) | 3.50 |
| Emulsifier (Atmos 300) | 0.50 |
| Ethoxyquin | 0.20 |
| Sodium benzoate | 0.10 |
| Calcium propionate | 0.275 |
| Additional antioxidant (Tenox 6) | 0.05 |

A cereal mixture was prepared by admixing the following ingredients:

| Ingredients | Parts by Weight |
| --- | --- |
| Poultry meal | 24.0 |
| Whole yellow corn | 17.8 |
| Dehulled soybean meal | 16.4 |

-continued

| Ingredients | Parts by Weight |
|---|---|
| Oat groats | 13.0 |
| Wheat | 12.5 |
| Propylene glycol | 5.0 |
| Phosphoric acid | 2.0 |
| Water | 1.0 |
| Salt | .8 |
| Vitamins, minerals, color, flavoring | 7.5 |

The meaty filling and cereal covering were placed in an extruder as shown in U.S. Pat. No. 3,764,715. The product was extruded with the cereal slightly expanding about the centerfilling upon extrusion. The product was crimped into pillow-shaped particles about ¾ to 1 inch long. The filling had a pH of 4.0 and a water activity, $A_w$, of about 0.99. The filling had a moisture content of about 56 percent by weight. The product was highly acceptable as a cat food and was shelf stable against mold and bacterial growth.

Example 40

Approximate equal parts of chicken necks and backs were ground and cooked in a pressure cooker. The cooked chicken was admixed with other ingredients in the following proportions:

| Ingredients | Parts by Weight |
|---|---|
| Chicken parts | 90.00 |
| Citric acid | 2.50 |
| Gelatinized corn flour | 3.075 |
| Animal fat (choice white grease) | 3.30 |
| Emulsifier (Atmos 300) | 0.50 |
| Ethoxyquin | 0.20 |
| Sodium benzoate | 0.10 |
| Calcium propionate | 0.275 |
| Additional antioxidant (Tenox 6) | 0.05 |

A cereal mixture was prepared by admixing the following ingredients:

| Ingredients | Parts by Weight |
|---|---|
| Poultry meal | 24.0 |
| Whole yellow corn | 17.8 |
| Dehulled soybean meal | 16.4 |
| Oat groats | 13.0 |
| Wheat | 12.5 |
| Propylene glycol | 5.0 |
| Phosphoric acid | 2.0 |
| Water | 1.0 |
| Salt | .8 |
| Vitamins, minerals, color, flavoring | 7.5 |

The meaty filling and cereal covering were placed in an extruder as shown in U.S. Pat. No. 3,764,715. The product was extruded with the cereal slightly expanding about the centerfilling upon extrusion. The product was crimped into pillow-shaped particles about ¾ to 1 inch long. The filling has a pH of 3.87 and a water activity, $A_w$, of about 0.99. The filling had a moisture content of about 57 percent by weight. The product was highly acceptable as a cat food and was shelf stable against mold and bacterial growth.

Example 41

Approximate equal parts of chicken necks and backs were ground and cooked in a pressure cooker. The cooked chicken was admixed with other ingredients in the following properties:

| Ingredients | Parts by Weight |
|---|---|
| Chicken parts | 90.00 |
| Tartaric acid | 2.50 |
| Gelatinized corn flour | 3.45 |
| Animal fat (choice white grease) | 3.30 |
| Emulsifier (Atmos 300) | 0.50 |
| Ethoxyquin | 0.20 |
| Sodium benzoate | 0.10 |
| Calcium propionate | 0.275 |
| Additional antioxidant (Tenox 6) | 0.05 |

A cereal mixture was prepared by admixing the following ingredients:

| Ingredients | Parts by Weight |
|---|---|
| Poultry meal | 24.0 |
| Whole yellow corn | 17.8 |
| Dehulled soybean meal | 16.4 |
| Oat groats | 13.0 |
| Wheat | 12.5 |
| Propylene glycol | 5.0 |
| Phosphoric acid | 2.0 |
| Water | 1.0 |
| Salt | .8 |
| Vitamins, minerals, color, flavoring | 7.5 |

The meaty filling and cereal covering were placed in an extruder as shown in U.S. Pat. No. 3,764,715. The product was extruded with the cereal slightly expanding about the centerfilling upon extrusion. The product was crimped into pillow-shaped particles about ¾ to 1 inch long. The filling had a pH of 3.52 and a water activity, $A_w$, of about 0.99. The filling had a moisture content of about 57 percent by weight. The product was highly acceptable as a cat food and was shelf stable against mold and bacterial growth.

Example 42

Approximate equal parts of chicken necks and backs were ground and cooked in a pressure booker. The cooked chicken was admixed with other ingredients in the following proportions.

| Ingredients | Parts by Weight |
|---|---|
| Chicken parts | 90.00 |
| Acetic acid | 1.75 |
| Gelatinized corn flour | 3.275 |
| Animal fat (choice white grease) | 3.675 |
| Emulsifier (Atmos 300) | 0.50 |
| Ethoxyquin | 0.20 |
| Sodium Benzoate | 0.10 |
| Calcium propionate | 0.275 |
| Additional antioxidant (Tenox 6) | 0.05 |

A cereal mixture was prepared by admixing the following ingredients:

| Ingredients | Parts by Weight |
|---|---|
| Poultry meal | 24.0 |
| Whole yellow corn | 17.8 |
| Dehulled soybean meal | 16.4 |
| Oat groats | 13.0 |
| Wheat | 12.5 |
| Propylene glycol | 5.0 |
| Phosphoric acid | 2.0 |
| Water | 1.0 |
| Salt | .8 |
| Vitamins, minerals, color, flavoring | 7.5 |

The meaty filling and cereal covering were placed in an extruder as shown in U.S. Pat. No. 3,764,715. The product was extruded with the cereal slightly expanding about the centerfilling upon extrusion. The product was crimped into pillow-shaped particles about ¾ to 1 inch long. The filling had a pH of 5.17 and a water activity, $A_w$, of about 0.59. The filling had a moisture content of about 56.0 percent by weight. The product was highly acceptable as a cat food and was shelf stable against mold and bacterial growth.

Example 43

Approximate equal parts of chicken necks and backs were ground and cooked in a pressure cooker. The cooked chicken was admixed with other ingredients in the following proportions:

| Ingredients | Parts by Weight |
|---|---|
| Chicken parts | 90.00 |
| Hydrochloric acid | 2.10 |
| Gelatinized corn flour | 3.275 |
| Animal fat (choice white grease) | 3.50 |
| Emulsifier (Atmos 300) | 0.50 |
| Ethoxyquin | 0.20 |
| Sodium benzoate | 0.10 |
| Calcium propionate | 0.275 |
| Additional antioxidant (Tenox 6) | 0.05 |

A cereal mixture was prepared by admixing the following ingredients:

| Ingredients | Parts by Weight |
|---|---|
| Poultry meal | 24.0 |
| Whole yellow corn | 17.8 |
| Dehulled soybean meal | 16.4 |
| Oat groats | 13.0 |
| Wheat | 12.5 |
| Propylene glycol | 5.0 |
| Phosphoric acid | 2.0 |
| Water | 1.0 |
| Salt | .8 |
| Vitamins, minerals, color, flavoring | 7.5 |

The meaty filling and cereal covering were placed in an extruder as shown in U.S. Pat. No. 3,764,715. The product was extruded with the cereal slightly expanding about the centerfilling upon extrusion. The product was crimped into pillow-shaped particles about ¾ to 1 inch long. The filling had a pH of 3.76 and a water activity, $A_w$, of about 0.99. The filling had a moisture content of about 56 percent by weight. The product was highly acceptable as a cat food and was shelf stable against mold and bacterial growth.

Example 44

Approximate equal parts of chicken necks and backs were ground and cooked in a pressure cooker. The cooked chicken was admixed with other ingredients in the following proportions:

| Ingredients | Parts by Weight |
|---|---|
| Chicken parts | 90.00 |
| Phosphoric acid | 2.15 |
| Gelatinized corn flour | 3.225 |
| Animal fat (choice white grease) | 3.50 |
| Emulsifier (Atmos 300) | 0.50 |
| Ethoxyquin | 0.20 |
| Sodium benzoate | 0.10 |
| Calcium propionate | 0.275 |
| Additional antioxidant (Tenox 6) | 0.05 |

A cereal mixture was prepared by admixing the following ingredients:

| Ingredients | Parts by Weight |
|---|---|
| Poultry meal | 24.0 |
| Whole yellow corn | 17.8 |
| Dehulled soybean meal | 16.4 |
| Oat groats | 13.0 |
| Wheat | 12.5 |
| Propylene glycol | 5.0 |
| Phosphoric acid | 2.0 |
| Water | 1.0 |
| Salt | .8 |
| Vitamins, minerals, color, flavoring | 7.5 |

The meaty filling and cereal covering were placed in an extruder as shown in U.S. Pat. No. 3,764,715. The product was extruded with the cereal slightly expanding about the centerfilling upon extrusion. The product was crimped into pillow-shaped particles about ¾ to 1 inch long. The filling had a pH of 2.67 and a water activity, $A_w$, of about 0.99. The filling had a moisture content of about 56 percent by weight. The product was highly acceptable as a cat food and was shelf stable against mold and bacterial growth.

Example 45

Pork liver was ground and cooked in a pressure cooker. The cooked liver was admixed with other ingredients in the following proportions:

| Ingredients | Parts by Weight |
|---|---|
| Liver | 96.90 |
| Adipic acid | 2.00 |
| Emulsifier (Atmos 300) | 0.50 |
| Ethoxyquin | 0.20 |
| Sodium benzoate | 0.10 |
| Calcium propionate | 0.25 |
| Additional Antioxidant (Tenox 6) | 0.05 |

The cereal mixture was prepared by admixing the following ingredients:

| Ingredients | Parts by Weight |
|---|---|
| Poultry meal | 24.0 |
| Whole yellow corn | 17.8 |
| Dehulled soybean meal | 16.4 |
| Oat groats | 13.0 |
| Wheat | 12.5 |
| Propylene glycol | 5.0 |
| Phosphoric acid | 2.0 |
| Water | 1.0 |
| Salt | .8 |
| vitamins, minerals, color, flavoring | 7.5 |

The meaty filling and cereal covering were placed in an extruder as shown in U.S. Pat. No. 3,764,715. The product was extruded with the cereal slightly expanding about the centerfilling upon extrusion. The product was crimped into pillow-shaped particles about ¾ to 1 inch long. The filling had a pH of 4.44 and a moisture content of 68 percent by weight. The product was highly acceptable as a cat food and was shelf stable against mold and bacterial growth.

Example 46

Pork liver was ground and cooked in a pressure cooker. The cooked liver was admixed with other ingredients in the following proportions:

| Ingredients | Parts by Weight |
|---|---|
| Liver | 96.90 |
| Phosphoric acid | 2.00 |
| Emulsifier (Atmos 300) | 0.50 |
| Ethoxyquin 0.20 | |
| Sodium benzoate | 0.10 |
| Calcium propionate | 0.25 |
| Additional antioxidant (Tenox 6) | 0.05 |

The cereal mixture was prepared by admixing the following ingredients:

| Ingredients | Parts by Weight |
|---|---|
| Poultry meal | 24.0 |
| Whole yellow corn | 17.8 |
| Dehulled soybean meal | 16.4 |
| Oat groats | 13.0 |
| Wheat | 12.5 |
| Propylene glycol | 5.0 |
| Phosphoric acid | 2.0 |
| Water | 1.0 |
| Salt | .8 |
| Vitamins, minerals, color, flavoring | 7.5 |

The meat filling and cereal covering were placed in an extruder as shown in U.S. Pat. No. 3,764,715. The product was extruded with the cereal slightly expanding about the centerfilling upon extrusion. The product was crimped into pillow-shaped particles about ¾ to 1 inch long. The filling had a pH of 3.59 and a moisture content of 68 percent by weight. The product was highly acceptable as a cat food and was shelf stable against mold and bacterial growth.

Example 47

Pork liver was ground and cooked in a pressure cooker. The cooked liver was admixed with other ingredients in the following proportions:

| Ingredients | Parts by Weight |
|---|---|
| Liver | 96.90 |
| Fumaric acid | 2.00 |
| Emulsifier (Atmos 300) | 0.50 |
| Ethoxyquin 0.20 | |
| Sodium benzoate | 0.10 |
| Calcium propionate | 0.25 |
| Additional antioxidant (Tenox 6) | 0.05 |

A cereal mixture was prepared by admixing the following ingredients:

| Ingredients | Parts by Weight |
|---|---|
| Poultry meal | 24.0 |
| Whole yellow corn | 17.8 |
| Dehulled soybean meal | 16.4 |
| Oat groats | 13.0 |
| Wheat | 12.5 |
| Propylene glycol | 5.0 |
| Phosphoric acid | 2.0 |
| Water | 1.0 |
| Salt | .8 |
| Vitamins, minerals, color, flavoring | 7.5 |

The meaty filling and cereal covering were placed in an extruder as shown in U.S. Pat. No. 3,764,715. The product was extruded with the cereal slightly expanding about the centerfilling upon extrusion. The product was crimped into pillow-shaped particles about ¾ to 1 inch long. The filling had a pH of 3.87 and a moisture content of 68 percent by weight. The product was highly acceptable as a cat food and was shelf stable against mold and bacterial growth.

Example 48

Example 1 was repeated except the animal fat was lard. The filling had the same moisture, water activity, and pH and was an acceptable shelf stable human food.

Example 49

Example 2 was repeated except the animal fat was lard. The filling had the same moisture, water activity, and pH and was an acceptable shelf stable human food.

Example 50

Example 3 was repeated except the animal fat was lard. The filling had the same moisture, water activity, and pH and was an acceptable shelf stable human food.

Example 51

Example 4 was repeated except the animal fat was lard. The filling had the same moisture, water activity, and pH and was an acceptable shelf stable human food.

Example 52

Example 8 was repeated except the animal fat was lard. The filling had the same moisture, water activity, and pH and was an acceptable shelf stable human food.

Example 53

Example 10 was repeated except the animal fat was lard. The filling had the same moisture, water activity, and pH and was an acceptable shelf stable human food.

Example 54

Example 11 was repeated except the animal fat was lard. The filling had the same moisture, water activity, and pH and was an acceptable shelf stable human food.

Example 55

Example 24 was repeated except the animal fat was lard. The filling had the same moisture, water activity, and pH and was an acceptable shelf stable human food.

Example 56

Example 30 was repeated except the animal fat was lard. The filling had the same moisture, water activity, and Ph and was an acceptable shelf stable human food.

Example 57

Example 34 was repeated except the animal fat was lard. The filling had the same moisture, water activity, and pH and was an acceptable shelf stable human food.

While the many examples hereinbefore illustrated do not show the complete range of all ingredients, highly acceptable foods still result when the amount of ingredients are altered to give various textures providing the specified ranges are adhered to.

The previous examples illustrate various high protein meaty material containing products. Any of the above examples may readily produce a highly nutritious and shelf stable food product simply by replacing a portion of the proteinaceous meaty material with a starchy filler material, but maintaining the proteinaceous meaty material in an amount greater than 50 percent by weight of the product.

The new product of this invention may be cast in several different shapes for use. It may be simply cut as centerfilled tubes with the appearance of a candy bar. It may also be crimped at the ends to form small pillow-shaped centerfilled products which may be used as hor d'ourves or fed to animals. In each case the food product produced herein is highly nutritious, is meat containing, is high in moisture content, and is shelf stable.

The product disclosed in Example 1 of this application constitutes the preferred embodiment of this invention although other embodiments as demonstrated in the examples are also highly acceptable.

Having fully described this new and unique invention I claim:

1. A centerfilled food product comprising a shelf stable, high moisture, meat containing filling having a major portion thereof enclosed by a cooked expanded cereal, said meat containing filling having a moisture content of at least about 50 percent by weight and having a water activity, $A_w$, of at least about 0.90, said filling comprising greater than 50 percent by weight cooked proteinaceous meaty material; from about 1 percent to about 35 percent by weight gelatinized starchy filler material with the total amount of cooked proteinaceous meaty material plus starchy filler material comprising greater than about 85 percent by weight of the filling; from about 1.7 percent to about 3.8 percent by weight edible, non-toxic acid sufficient to cause the filling to have a pH of from about 3.9 to about 5.5; and an effective amount of antimycotic.

2. A centerfilled food product as in claim 1 which includes an effective amount of antioxidant in the filling.

3. A food product as in claim 1 which also includes from about 2 to 4 percent by weight edible fat or oil in the filling.

4. A centerfilled food product as in claim 1 which also includes from about 0.1 to 3 percent by weight emulsifier in the filling.

5. A centerfilled food product as in claim 1 which also includes from about 2 to 4 percent by weight edible fat or oil and from about 0.1 to 3 percent by weight emulsifier in the filling.

6. A centerfilled food product comprising a shelf stable, high moisture, meat containing filling having a major portion thereof enclosed by a cooked expanded cereal, said meat containing filling having a water content of at least about 50 percent by weight and having a water activity, $A_w$, of at least about 0.90, said filling comprising greater than about 90 percent by weight cooked proteinaceous meaty material, from 1 percent to 5 percent by weight gelatinized starchy material, from about 1.7 percent to about 3.8 percent by weight edible, non-toxic acid sufficient to cause the filling to have a pH of from about 3.9 to 5.5, and an effective amount of antimycotic.

7. A centerfilled food product as in claim 6 which also includes an effective amount of antioxidant in the filling.

8. A centerfilled food product as in claim 6 which also includes from about 2 to about 4 percent by weight edible fat or oil in the filling.

9. A centerfilled food product as in claim 6 which also includes from about 0.1 to 3 percent by weight emulsifier in the filling.

10. A centerfilled food product as in claim 6 which also includes from about 2 to 4 percent by weight edible fat or oil and from about 0.1 to 3 percent by weight emulsifier in the filling.

11. A centerfilled food product comprising a shelf stable, high moisture, liver-like filling having a major portion thereof enclosed by a cooked expanded cereal, said liver-like filling having a water content at least about 50 percent by weight and having a water activity, $A_w$, of at least about 0.90, said liver-like filling comprising about 90 percent by weight cooked pork or beef liver, about 4 percent by weight edible fat or oil, about 3 percent by weight gelatinized starch, about 2 percent by weight edible acid, and an effective amount of antioxidant and antimycotic.

12. A centerfilled food product as in claim 11 which also includes about 0.5 percent emulsifier in the filling.

13. centerfilled center-filled food product comprising a shelf stable, high moisture, liver-like filling having a major portion thereof enclosed by a cooked expanded cereal, said liver-like filling having a water content of at least about 50 percent by weight and having a water activity, $A_w$, of at least about 0.90, said filling comprising from 85 to 95 percent by weight cooked pork or beef liver, from 0–6 percent by weight edible fat or oil, from 2–5 percent by weight gelatinized starch material, from about 1.7 to 3.8 percent by weight edible, non-toxic acid in order to provide a pH of from about 3.9 to 5.5, and an effective amount of antioxidant and antimycotic.

14. A centerfilled food product comprising a shelf stable, high moisture, chicken based filling having a major portion thereof enclosed by a cooked expanded cereal, said chicken based filling having a water content of at least about 50 percent by weight and having a water activity, $A_w$, of at least about 0.90, said filling comprising from about 85 percent to 95 percent by weight cooked chicken parts, from about 1 to 6 percent by weight edible fat or oil, from about 2 to 6 percent by weight gelatinized starch material, from about 1.7 to 3.8 percent by weight edible, non-toxic acid in order to give a pH of from about 3.9 to 5.5, and an effective amount of antioxidant and antimycotic.

15. A centerfilled food product as in claim 14 which also includes from about 0.1 to 3 percent by weight emulsifier in the filling.

16. A centerfilled food product comprising a shelf stable, high moisture, fish based filling having a major portion thereof enclosed by a cooked expanded cereal, said fish based filling having a water content of at least about 50 percent by weight and a water activity, $A_w$, of at least about 0.90, said filling comprising from about 85 to 95 percent by weight cooked fish, from about 1 to 6 percent by weight edible fat or oil, from about 2 to 5 percent by weight gelatinized starch materials, from about 1.7 to 3.8 percent by weight edible, non-toxic acid in order to provide a pH of from about 3.9 to 5.5, and an effective amount of antioxidant and antimycotic.

17. A shelf stable, high moisture containing center-filled food product such as in claim 16 which also includes from about 0.1 to 3 percent by weight emulsifier in the filling.

18. A process for producing a centerfilled shelf stable food product, said process comprising the steps:
   A. preparing a shelf stable filling material by cooking a proteinaceous meaty material; admixing the meaty material with a starchy filler material, an edible non-toxic acid, and an effective amount antimycotic, in amounts sufficient to provide at least about 50 percent by weight cooked, proteinaceous, meaty material and from about 1 percent to about 35 percent by weight gelatinized starchy filler material with the total amount of cooked, proteinaceous meaty material plus starchy filler material comprising greater than about 85 percent by weight of the filling, from about 1.7 percent to about 3.8 percent by weight edible, non-toxic acid sufficient to cause the filling to have a pH of from about 3.9 to about 5.5;
   B. extruding under puffing conditions a hot cooked cereal dough through a first die thereby forming an expanded cereal extrudate;
   C. simultaneously extruding the shelf stable filling through a second die, said second die being positioned within the orifice of the first die in such a manner that the extrudate from the first die completely surrounds the extrudate from the second die and in such a manner that the direction of flow of the second extrudate is the same as the direction of flow of the first extrudate, and said shelf stable filling being in a heated state as it is being extruded within the first die extrudate;
   D. subdividing the extrudate into food shaped pieces; and
   E. drying the food shaped pieces to decrease the moisture content of the expanded cereal outer extrudate.

19. A process for producing a centerfilled shelf stable food product, said process comprising the steps:
   A. preparing a shelf stable filling material by admixing a proteinaceous meaty material with a starchy filler material, an edible, non-toxic acid and an effective amount of antimycotic in amounts sufficient to provide at least about 50 percent by weight proteinaceous, meaty material and from about 1 percent to about 35 percent by weight gelatinized starchy filler material with the total amount of proteinaceous meaty material plus starchy filler material comprising greater than about 85 percent by weight of the filling, from about 1.7 percent to about 3.8 percent by weight edible, non-toxic acid sufficient to cause the filling to have a pH of from about 3.9 to about 5.5;
   B. cooking the filling mixture;
   C. extruding under puffing conditions a hot cooked cereal dough through a first die thereby forming an expanded cereal extrudate;
   D. simultaneously extruding the shelf stable filling through a second die, said second die being positioned within the orifice of the first die in such a manner that the extrudate from the first die completely surrounds the extrudate from the second die and in such a manner that the direction of flow of the second extrudate is the same as the direction of flow of the first extrudate, and said shelf stable filling being in a heated state as it is being extruded within the first die extrudate;
   E. subdividing the extrudate into food shaped pieces; and
   F. drying the food shaped pieces to decrease the moisture content of the expanded cereal outer extrudate.

20. A process for producing a centerfilled shelf stable food product, said process comprising the steps:
   A. preparing a shelf stable filling material by cooking a proteinaceous meaty material; admixing the cooked meaty material with a gelatinized starchy filler, an edible non-toxic acid, and an effective amount of antioxidant and antimycotic in amounts sufficient to provide at least about 90 percent by weight cooked, proteinaceous, meaty material, from about 1 percent to about 5 percent by weight gelatinized starchy filler material, and from about 1.7 percent to about 3.8 percent by weight edible, non-toxic acid sufficient to cause the filling to have a pH of from about 3.9 to 5.5;
   B. extruding under puffing conditions a hot cooked cereal dough through a first die thereby forming an expanded cereal extrudate;
   C. simultaneously extruding the shelf stable filling through a second die, said second die being positioned within the orifice of the first die in such a manner that the extrudate from the first die completely surrounds the extrudate from the second die and in such a manner that the direction of flow of the second extrudate is the same as the direction of flow of the first extrudate, and said shelf stable filling being in a heated state as it is being extruded within the first die extrudate;
   D. subdividing the extrudate into food shaped pieces; and
   E. drying the food shaped pieces to decrease the moisture content of the expanded cereal outer extrudate.

21. A process as in claim 20 which also includes admixing from about 2 to 4 percent by weight edible fat or oil in the initial mixture of filling material.

22. A process as in claim 20 which also includes admixing from about 0.1 to about 3 percent by weight emulsifier in the initial mixture of filling material.

23. A process as in claim 20 which also includes admixing from about 2 percent to 4 percent by weight edible fat or oil and from about 0.1 to 3 percent by weight emulsifier in the initial mixture of filling material.

24. A process for producing a centerfilled shelf stable food product, said process comprising the steps:
   A. preparing a liver-like filling material by cooking pork or beef liver; admixing the liver with a gelatinized starchy material, an edible non-toxic acid, and effective amount of antioxidant and antimycotic in amounts sufficient to provide from about 85 to 95 percent by weight edible fat or oil, from about 2–5 percent by weight gelatinized starchy material, and from about 1.7 to 3.8 percent by weight edible, non-toxic acid in order to provide a pH of from about 3.9 to 5.5;
   B. extruding under puffing conditions a hot cooked cereal dough through a first die thereby forming an expanded cereal extrudate;

C. simultaneously extruding the liver-like filling through a second die, said second die being positioned within the orifice of the first die in such a manner that the extrudate from the first die completely surrounds the extrudate from the second die and in such a manner that the direction of flow of the second extrudate is the same as the direction of flow of the first extrudate, and said liver-like filling being in a heated state as it is being extruded within the first die extrudate;

D. subdividing the extrudate into food shaped pieces; and

E. drying the food shaped pieces to decrease the moisture content of the expanded cereal outer extrudate.

25. A process for producing a centerfilled shelf stable food product, said process comprising the steps:

A. preparing a chicken-based filling material by cooking a mixture of chicken parts; admixing the cooked chicken parts with a gelatinized starchy filler material, an edible non-toxic acid, and an effective amount of antioxidant and antimycotic in amounts sufficient to provide from about 85–95 percent by weight cooked chicken parts, from about 2–5 percent by weight gelatinized starchy filler material, and from about 1.7 to 3.8 percent by weight edible, non-toxic acid in order to provide a pH of from about 3.9 to 5.5;

B. extruding under puffing conditions a hot cooked cereal dough through a first die thereby forming an expanded cereal extrudate;

C. simultaneously extruding the chicken-based filling through a second die, said second die being positioned within the orifice of the first die in such a manner that the extrudate from the first die completely surrounds the extrudate from the second die and in such a manner that the direction of flow of the second extrudate is the same as the direction of flow of the first extrudate, and said chicken-based filling being in a heated state as it is being extruded within the first die extrudate;

D. subdividing the extrudate into food shaped pieces; and

E. drying the food shaped pieces to decrease the moisture content of the expanded cereal outer extrudate.

26. A process for producing a centerfilled shelf stable food product, said process comprising the steps:

A. preparing a fish-based filling material by cooking fish; admixing the cooked fish with a gelatinized starchy filler material, an edible non-toxic acid, and an effective amount of antioxidant and antimycotic in amounts sufficient to provide from about 85–95 percent by weight cooked fish, from about 2–5 percent by weight gelatinized starchy filler material, from about 1.7 to 3.8 percent by weight edible, non-toxic acid in order to provide a pH of from about 3.9 to 5.5;

B. extruding under puffing conditions a hot cooked cereal dough through a first die thereby forming an expanded cereal extrudate;

C. simultaneously extruding the fish-based filling through a second die, said second die being positioned within the orifice of the first die in such a manner that the extrudate from the first die completely surrounds the extrudate from the second die and in such a manner that the direction of flow of the second extrudate is the same as the direction of flow of the first extrudate, and said fish-based filling being in a heated state as it is being extruded within the first die extrudate;

D. subdividing the extrudate into food shaped pieces; and

E. drying the food shaped pieces to decrease the moisture content of the expanded cereal outer extrudate.

27. A process for producing a centerfilled shelf stable food product, said process comprising the steps:

A. preparing a shelf stable filling material by cooking a fish; admixing the cooked fish with an edible, non-toxic acid and an effective amount of antimycotic; said edible, non-toxic acid being provided in an amount of from about 1.7 percent to about 3.8 percent by weight and being sufficient to cause the filling to have a pH of from about 3.9 to about 5.5;

B. extruding under puffing conditions a hot cooked cereal dough through a first die thereby forming an expanded cereal extrudate;

C. simultaneously extruding the shelf stable filling through a second die, said second die being positioned within the orifice of the first die in such a manner that the extrudate from the first die completely surrounds the extrudate from the second die and in such a manner that the direction of flow of the second extrudate is the same as the direction of flow of the first extrudate, and said shelf stable filling being in a heated state as it is being extruded within the first die extrudate;

D. subdividing the extrudate into food shaped pieces; and

E. drying the food shaped pieces to decrease the moisture content of the expanded cereal outer extrudate.

* * * * *

UNITED STATES PATENT OFFICE
CERTIFICATE OF CORRECTION

PATENT NO. : 3,922,353
DATED : November 25, 1975
INVENTOR(S) : John W. Bernotavicz It is certified that error appears in the above-identified patent and that said Letters Patent are hereby corrected as shown below:

In Column 2, at Line 62, "galatiinized" should read --gelatinized--.

In Column 3, at Line 8, "galatinized" should read --gelatinized--.

In Column 8, at Line 36, "in" should read --is--.

In Column 9, at Line 27, "evey" should read --every--.

In Column 41, at Line 50, (which is Line 1 of Claim 3), "A food product" should read --A centerfilled food product--.

In Column 42, at Line 32, (which is also Line 1 of Claim 13), "centerfilled center-filled" should read --A centerfilled--.

Signed and Sealed this thirtieth Day of March 1976

[SEAL]

Attest:

RUTH C. MASON
*Attesting Officer*

C. MARSHALL DANN
*Commissioner of Patents and Trademarks*